(12) United States Patent
Yamamoto et al.

(10) Patent No.: US 10,991,931 B2
(45) Date of Patent: Apr. 27, 2021

(54) ENERGY STORAGE APPARATUS

(71) Applicant: GS Yuasa International Ltd., Kyoto (JP)

(72) Inventors: Yuichiro Yamamoto, Kyoto (JP); Shogo Tsuruta, Kyoto (JP)

(73) Assignee: GS YUASA INTERNATIONAL, LTD., Kyoto (JP)

(*) Notice: Subject to any disclaimer, the term of this patent is extended or adjusted under 35 U.S.C. 154(b) by 489 days.

(21) Appl. No.: 15/735,113

(22) PCT Filed: May 19, 2016

(86) PCT No.: PCT/JP2016/064838
§ 371 (c)(1),
(2) Date: Dec. 8, 2017

(87) PCT Pub. No.: WO2016/199558
PCT Pub. Date: Dec. 15, 2016

(65) Prior Publication Data
US 2020/0035979 A1    Jan. 30, 2020

(30) Foreign Application Priority Data

Jun. 12, 2015 (JP) .............................. JP2015-119807
Jun. 12, 2015 (JP) .............................. JP2015-119808

(51) Int. Cl.
H01M 2/34        (2006.01)
H01G 9/00        (2006.01)
(Continued)

(52) U.S. Cl.
CPC ............ *H01M 2/34* (2013.01); *H01G 9/0003* (2013.01); *H01G 9/008* (2013.01); *H01G 9/08* (2013.01); *H01M 2/1016* (2013.01); *H01M 2/30* (2013.01)

(58) Field of Classification Search
CPC .......... H01G 9/0003; H01G 2/16; H01G 2/04; H01G 9/008; H01G 11/78; H01G 9/08;
(Continued)

(56) References Cited

U.S. PATENT DOCUMENTS 5,645,448 A * 7/1997 Hill ...................... H01H 85/205
                                                439/522
6,146,788 A   11/2000 Ikeda et al.
(Continued)

FOREIGN PATENT DOCUMENTS

CN      202871879 U      4/2013
JP      2000-223095 A    8/2000
(Continued)

OTHER PUBLICATIONS

International Search Report (ISR) (PCT Form PCT/ISA/210), in PCT/JP2016/064838, dated Jul. 5, 2016.
(Continued)

*Primary Examiner* — Jonathan G Jelsma
*Assistant Examiner* — Omar M Kekia
(74) *Attorney, Agent, or Firm* — McGinn I.P. Law Group, PLLC

(57) ABSTRACT

An energy storage apparatus includes: an energy storage device which includes an electrode terminal; an outer case; and an external connection terminal. The external connection terminal includes: an external connection part to be connected to an external conductive member; a circuit breaking part; and a bus bar which connects the electrode terminal or the external connection part with the circuit breaking part, and which is formed in the outer case by insert molding. The bus bar includes an outer exposed portion on which the circuit breaking part is detachably mounted from the outside of the outer case.

20 Claims, 15 Drawing Sheets

(51) Int. Cl.
*H01G 9/008* (2006.01)
*H01G 9/08* (2006.01)
*H01M 2/10* (2006.01)
*H01M 2/30* (2006.01)

(58) Field of Classification Search
CPC .......... H01G 11/10; H01G 9/26; H01M 2/10; H01M 10/425; H01M 2/20; H01M 2/1016; H01M 2/34; H01M 2/30; H01M 2200/103
USPC .......................................................... 429/61
See application file for complete search history.

(56) References Cited

U.S. PATENT DOCUMENTS

| | | | |
|---|---|---|---|
| 6,240,637 | B1 | 6/2001 | Ikeda et al. |
| 2012/0121966 | A1* | 5/2012 | Kim ........................ H01M 2/06 |
| | | | 429/158 |
| 2012/0208050 | A1 | 8/2012 | Chen |
| 2012/0231324 | A1 | 9/2012 | Brisbane |
| 2013/0011255 | A1 | 1/2013 | Horng et al. |
| 2013/0288530 | A1 | 10/2013 | Zhao |
| 2014/0220396 | A1* | 8/2014 | Lee ...................... H01M 2/1077 |
| | | | 429/61 |
| 2015/0236326 | A1* | 8/2015 | Kim .................. H01M 10/4207 |
| | | | 429/159 |
| 2016/0036029 | A1 | 2/2016 | Tononishi |

FOREIGN PATENT DOCUMENTS

| | | |
|---|---|---|
| JP | H 11-120988 A | 8/2000 |
| JP | 2002-246011 A | 8/2002 |
| JP | 2006-040796 A | 2/2006 |
| JP | 2009-148011 A | 7/2009 |
| JP | 2011-049014 A | 3/2011 |
| JP | 2011-258487 A | 12/2011 |
| JP | 2013-516041 A | 5/2013 |
| JP | 2013-109974 A | 6/2013 |
| JP | 2013-196932 A | 9/2013 |
| JP | 2014-164798 A | 9/2014 |
| JP | 2014-203745 A | 10/2014 |
| JP | 2014-203747 A | 10/2014 |
| JP | 2015-011849 A | 1/2015 |
| JP | 2015-507819 A | 3/2015 |
| JP | 2016-33907 A | 3/2016 |

OTHER PUBLICATIONS

Extended European Search Report dated Apr. 12, 2018 in corresponding European Application No. 16807265.0.

* cited by examiner

ENERGY STORAGE APPARATUS

TECHNICAL FIELD

The present invention relates to an energy storage apparatus which includes an energy storage device, an outer case, and an external connection terminal.

BACKGROUND ART

In an energy storage apparatus which includes an energy storage device, there has been known the configuration where the energy storage apparatus includes a fuse for protecting the energy storage device from an overcurrent generated by external short-circuiting or the like (for example, see Patent Document 1).

PRIOR ART DOCUMENT

Patent Document

Patent Document 1: JP 2011-49014 A

SUMMARY OF THE INVENTION

Problems to be Solved by the Invention

However, in the configuration described in patent document 1, insulation of bus bars is not taken into consideration. Further, in the configuration described in patent document 1, the bus bar has the complicated structure for enabling an exchange of a fuse.

The present invention has been made in view of the above-mentioned drawback, and it is an object of the present invention to provide an energy storage apparatus where a circuit breaking part such as a fuse can be exchanged while allowing bus bars to have the insulation structure and the simple structure.

Means for Solving the Problems

To achieve the above-mentioned object, according to an aspect of the present invention, there is provided an energy storage apparatus which includes: an energy storage device which includes an electrode terminal; an outer case; and an external connection terminal. The external connection terminal includes: an external connection part to be connected to an external conductive member; a circuit breaking part; and a bus bar which connects the electrode terminal or the external connection part with the circuit breaking part, and which is formed in the outer case by insert molding. The bus bar includes an outer exposed portion on which the circuit breaking part is detachably mounted from an outside of the outer case.

Advantages of the Invention

According to the present invention, it is possible to provide an energy storage apparatus where a circuit breaking part can be exchanged while allowing bus bars to have the insulation structure and the simple structure.

MODE FOR CARRYING OUT THE INVENTION

Figure 1:
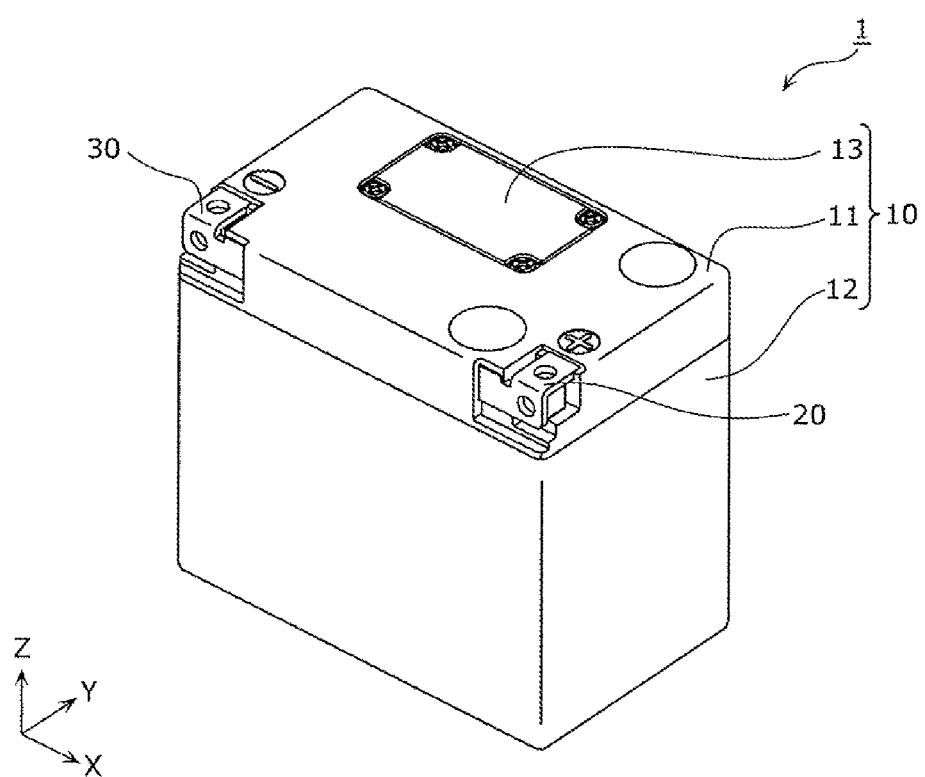
FIG. 1 is a perspective view showing an external appearance of an energy storage apparatus according to an embodiment.

In an energy storage apparatus described in patent document 1, a fuse is provided in an exchangeable manner. Accordingly, even when external short-circuiting or the like occurs, it is possible to continuously use the energy storage apparatus without exchanging the energy storage device by exchanging the fuse.

In the energy storage apparatus, it is necessary to insulate a bus bar for preventing undesired short-circuiting between the bus bar and other conductive members. However, the insulation of the bus bar is not taken into consideration in the configuration described in patent document 1.

Further, in the configuration described in patent document 1, to enable an exchange of the fuse, the bus bar has the complicated structure and has a large resistance because of a large number of fastening portions. Further, there is a concern about the bus bar having the complicated structure so that assembling of the energy storage apparatus becomes difficult.

The present invention has been made to overcome the above-mentioned drawbacks, and it is an object of the present invention to provide an energy storage apparatus where a circuit breaking part such as a fuse can be exchanged while allowing bus bars to have the insulation structure and the simple structure.

To achieve the above-mentioned object, according to an aspect of the present invention, there is provided an energy storage apparatus which includes: an energy storage device which includes an electrode terminal; an outer case; and an external connection terminal. The external connection terminal includes: an external connection part to be connected to an external conductive member; a circuit breaking part; and a bus bar which connects the electrode terminal or the external connection part with the circuit breaking part, and which is formed in the outer case by insert molding. The bus bar includes an outer exposed portion on which the circuit breaking part is detachably mounted from an outside of the outer case.

With such a configuration, the bus bar is formed in the outer case by insert molding. Accordingly, the bus bar can have the insulation structure and the simple structure. Further, in the portion to which the circuit breaking part is connected, the bus bar formed by insert molding is exposed. Accordingly, the circuit breaking part can be exchanged. That is, according to this aspect, it is possible to exchange the circuit breaking part while allowing the bus bar to have the insulation structure and the simple structure.

The outer case may have a recessed portion which opens toward the outside of the outer case and accommodates the circuit breaking part, and the outer exposed portion may be exposed from an inner surface of the recessed portion.

With such a configuration, since the outer exposed portion is exposed from the inner surface of the recessed portion, hermetic property of the inside of the recessed portion can be ensured. To be more specific, the bus bar is formed in the outer case by insert molding and hence, the bus bar and the outer case are brought into close contact with each other around the outer exposed portion of the inner surface of the recessed portion. Accordingly, gas tightness can be maintained between the bus bar and the outer case. Further, in the case where the recessed portion is opened toward the inside of the outer case, it is necessary to remove the outer case for exchanging the circuit breaking part. However, the recessed portion is opened toward the outside of the outer case and hence, it is possible to exchange the circuit breaking part without removing the outer case.

The outer case may include a lid portion which openably closes an opening of the recessed portion, and the lid portion may be configured to cover the outer exposed portion in a state where the lid portion closes the opening.

With such a configuration, with the provision of the lid portion which closes the opening of the recessed portion, hermetic property of the inside of the recessed portion can be ensured with more certainty.

The bus bar may be bent following a recess in the recessed portion.

With such a configuration, the bus bar can be bent following the recess in the recessed portion and hence, the formation of a wasteful space can be suppressed whereby space saving can be realized.

The energy storage apparatus may further include a fastening portion configured to detachably fasten the circuit breaking part to the outer exposed portion, and a portion of the fastening portion may be formed in the outer case by insert molding.

With such a configuration, a portion of the fastening portion is formed in the outer case by insert molding and hence, the fastening portion is fixed whereby an exchange of the circuit breaking part can be performed easily.

The bus bar may connect the external connection part and the circuit breaking part to each other, and may be integrally formed with the external connection part.

With such a configuration, the bus bar is integrally formed with the external connection part and hence, the number of parts can be reduced. Further, compared to a case where the bus bar is formed as a part separate from the external connection part, the reduction of resistance between the bus bar and the external connection part can be realized.

The bus bar may include a first bus bar which connects the external connection part and the circuit breaking part to each other, and a second bus bar which connects the electrode terminal and the circuit breaking part to each other.

That is, the circuit breaking part may be disposed between the first bus bar and the second bus bar. With such a configuration, the degree of freedom in arrangement of the circuit breaking part is enhanced.

The outer case may include: a body which accommodates the energy storage device; and a lid body which covers an opening of the body and in which the bus bar is formed by insert molding, and the outer exposed portion may be exposed from the lid body.

With such a configuration, the bus bar is formed in the lid body by insert molding and hence, rigidity of the lid body can be increased.

The bus bar may include: an inner exposed portion exposed to the inside of the outer case at a position shifted from the outer exposed portion as viewed in a top plan view of the lid body; and a connection plate portion which is formed in the outer case by insert molding and connects the outer exposed portion and the inner exposed portion to each other.

With such a configuration, the connection plate portion which connects the outer exposed portion of the bus bar and the inner exposed portion of the bus bar to each other is formed in the outer case by insert molding. Accordingly, it is possible to suppress short-circuiting of the bus bar with other conductive members.

The bus bar may be formed in the outer case by insert molding at a position which opposedly faces the electrode terminal.

With such a configuration, there is a concern about short-circuiting when the bus bar is exposed at the position which opposedly faces the electrode terminal. However, the bus bar is formed in the outer case by insert molding and hence, even when the bus bar is disposed at a position which opposedly faces the electrode terminal, such short-circuiting can be suppressed.

The outer exposed portion may be positioned on a surface of the outer case on a side opposite to a position where the external connection part is disposed.

There is a concern about short-circuiting when the outer exposed portion is disposed in the vicinity of the external connection part. However, with such a configuration, the outer exposed portion is disposed on the side opposite to the external connection part and hence, such short-circuiting can be suppressed.

A cross-sectional area of the bus bar may be set equal to or larger than a cross-sectional area of the external connection part.

With such a configuration, the bus bar has a cross-sectional area equal to or larger than the cross-sectional area of the external connection part. Accordingly, when an electric current flows in the bus bar, it is possible to prevent an increase of a resistance value.

In an energy storage apparatus provided with an energy storage device, conventionally, there has been known a configuration where an external connection terminal connected to the outside is disposed in an outer case (for example, see patent document 2: JP 2013-516041 A). Such an energy storage apparatus includes conductive members for connecting electrode terminals of the energy storage device and the external connection terminals (a positive electrode lead and a negative electrode lead in the above-mentioned patent document 2).

However, in the above-mentioned conventional energy storage apparatus, due to the provision of external connection terminals, the conductive members which connect the electrode terminals of the energy storage device and the external connection terminals become necessary so that the structure of the energy storage apparatus becomes complicated. Further, it is necessary to establish insulation between the conductive members and other conductive members and hence, the structure of the energy storage apparatus becomes further complicated. Accordingly, an assembling operation of the energy storage apparatus becomes complicated thus giving rise to a drawback such as lowering of productivity and an increase of cost.

According to an aspect of the present invention, there is provided an energy storage apparatus which includes: an energy storage device; an outer case; and an external connection terminal, wherein the external connection terminal includes: an external connection part which is connected to an external conductive member; a terminal connection part connected to an electrode terminal of the energy storage device; and a first insert part disposed between the external connection part and the terminal connection part, and formed in the outer case by insert molding.

With such a configuration, in the energy storage apparatus, the external connection terminal includes: the external connection part connected to the external conductive member; the terminal connection part connected to the electrode terminal of the energy storage device; and the first insert part formed in the outer case by insert molding between the external connection part and the terminal connection part. That is, the external connection terminal is directly connected to the electrode terminal of the energy storage device, and the portions of the external connection terminal other than the portions which are connected to the electrode terminal of the energy storage device and the external conductive member are formed in the outer case by insert molding. With such a configuration, it is unnecessary to dispose an additional conductive member between the external connection terminal and the electrode terminal of the energy storage device. Further, insulation property can be ensured with the simple configuration referred to as insert molding and hence, according to the energy storage apparatus, the external connection terminal can be arranged with the simple configuration.

The external connection terminal may further include an engaging portion which is connected to the external connection part at a position different from the first insert part, and is engaged with the outer case.

With such a configuration, the external connection terminal is engaged with the outer case at the engaging portion. Accordingly, for example, even when a torque is applied to the external connection terminal when the external conductive member is connected to the external connection terminal, the external connection terminal can be firmly fixed with respect to the outer case.

The external connection terminal may further include a second insert part which is connected to the external connection part at a position different from the first insert part, and is formed in the outer case by insert molding.

With such a configuration, the external connection terminal further includes the second insert part, and insert molding of the external connection terminal in the outer case is performed at two places of the first insert part and the second insert part. Accordingly, the external connection terminal can be firmly fixed to the outer case.

The external connection part may include: a first connection portion extending in a first direction from the first insert part; and a second connection portion extending in a second direction from the second insert part, and a third direction which is orthogonal to the first direction in the first connection portion may be a direction which differs from a fourth direction orthogonal to the second direction in the second connection portion.

With such a configuration, in the external connection part, the direction (third direction) orthogonal to the extending direction (first direction) from the first insert part of the first connection portion and the direction (fourth direction) orthogonal to the extending direction (second direction) from the second insert part of the second connection portion differ from each other. That is, for example, the first connection portion is formed in the outer case by insert molding in the vertical direction, while the second connection portion is formed in the outer case by insert molding in the horizontal direction. In this manner, the direction that the first connection portion is formed in the outer case by insert molding and the direction that the second connection portion is formed in the outer case by insert molding differ from each other. Accordingly, for example, even when a torque is applied to the external connection terminal when the external conductive member is connected to the external connection terminal, the external connection terminal can be firmly fixed with respect to the outer case.

A gap may be formed between an outer surface of the outer case and a portion extending along the outer surface of the external connection part.

With such a configuration, the gap is formed between the outer surface of the outer case and the external connection part. Accordingly, in connecting the external conductive member to the external connection terminal, it is possible to prevent the rotation of the conductive member by inserting a portion of the conductive member in the gap. That is, it is possible to adopt the terminal having a rotation preventing function as the external conductive member connected to the external connection terminal.

The external connection part, the terminal connection part and the first insert part may be formed into an integral body.

With such a configuration, the external connection part, the terminal connection part and the first insert part is formed into an integral body and hence, the external connection terminal can be arranged with the simple configuration.

The external connection terminal may further include a circuit breaking part between the external connection part and the terminal connection part.

With such a configuration, the external connection terminal includes the circuit breaking part between the external connection part and the terminal connection part. Accordingly, the external connection terminal can also have a function of breaking a circuit.

Hereinafter, an energy storage apparatus according to an embodiment of the present invention is described with reference to drawings. The respective drawings are provided only for the description of energy storage apparatus according to the embodiment and modifications of the embodiment, and are not always described strictly accurately.

The embodiment described hereinafter is one preferred specific example of the present invention. In the embodiment described hereinafter, numerical values, shapes, materials, constitutional elements, the arrangement positions and connection states of the constitutional elements, an assembling method, the order of assembling steps and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements.

Embodiment

Figure 2:
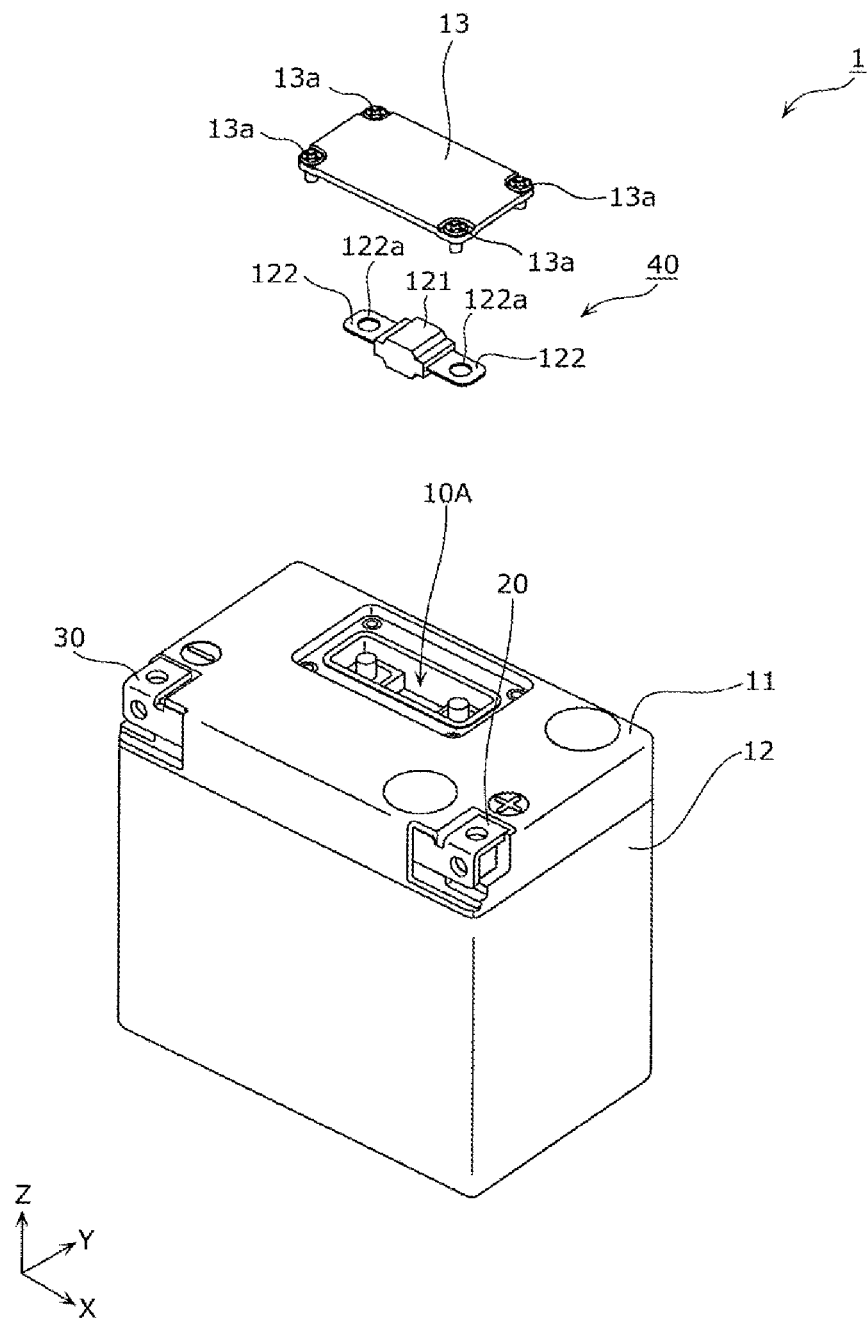
FIG. 2 is a perspective view showing a state where a fuse of the energy storage apparatus according to the embodiment is being exchanged.
Figure 3:
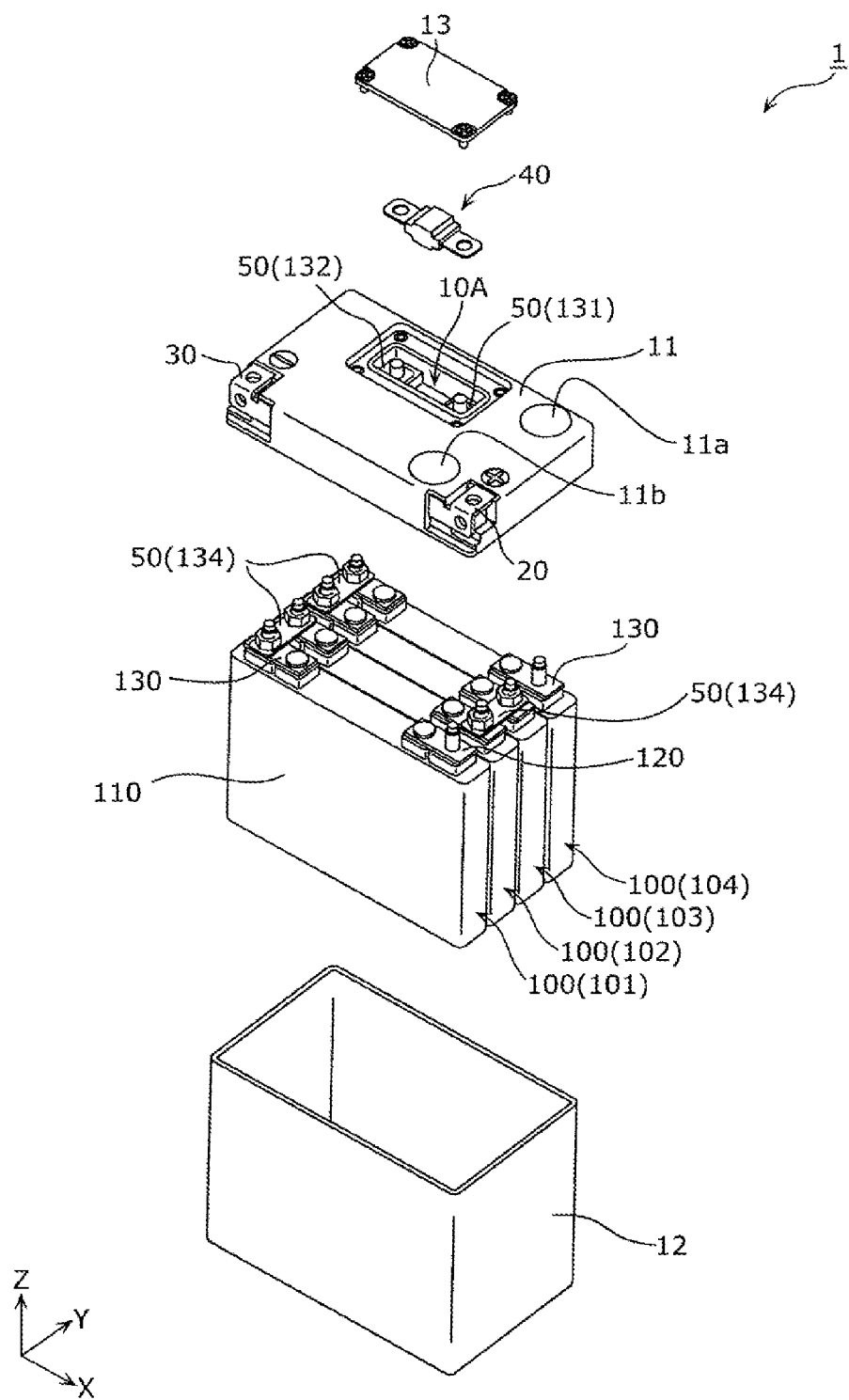
FIG. 3 is an exploded perspective view of the energy storage apparatus according to the embodiment.

First, a schematic configuration of an energy storage apparatus 1 is described with reference to FIG. 1 to FIG. 3.

FIG. 1 is a perspective view showing an external appearance of the energy storage apparatus 1 according to the embodiment of the present invention. FIG. 2 is a perspective view showing a state where a fuse 40 of the energy storage apparatus 1 according to the embodiment of the present invention is being exchanged. FIG. 3 is an exploded perspective view showing respective constitutional elements when the energy storage apparatus 1 according to the embodiment of the present invention is disassembled.

In these drawings, a Z axis direction is taken as a vertical direction and, hereinafter, the description is made by assuming the Z axis direction as the vertical direction. However, depending on a use state, there may be a case where the Z axis direction and the vertical direction do not agree with each other. Accordingly, the Z axis direction is not limited to the vertical direction.

The energy storage apparatus 1 is an apparatus which includes one or more energy storage devices, and can charge electricity from the outside to the energy storage devices or can discharge electricity to the outside from the energy storage devices. For example, the energy storage apparatus 1 may be a battery module used for power storage application, power source application or the like.

First, as shown in FIG. 1, the energy storage apparatus 1 includes an outer case 10, and a positive electrode external terminal 20 and a negative electrode external terminal 30 which are external connection terminals. As shown in FIG. 2, the energy storage apparatus 1 includes a circuit breaking part 40. As shown in FIG. 3, the energy storage apparatus 1 further includes energy storage devices 100 (in FIG. 3, four energy storage devices 101 to 104), and bus bars 50 inside the outer case 10.

In this embodiment, the description is made with respect to a case where the circuit breaking part is formed of a fuse (that is, the circuit breaking part 40 is described as a fuse 40). However, the present invention is not limited to such a configuration. For example, the circuit breaking part may be formed of a relay, or may be a field effect transistor (FET). To be more specific, the relay can acquire an advantageous effect of lowering a resistance at the time of connection, and the FET can acquire an advantageous effect of realizing space saving due to the configuration of a semiconductor element or the like.

As another configuration of the circuit breaking part, a metal member, that is, a fusing breakable metal member having a portion breakable by fusing where a cross-sectional area is partially decreased due to narrowing a width of the portion or decreasing a thickness of the portion can be disposed in an exchangeable manner. For example, the fusing breakable metal member is formed by using the same material as the bus bar 50, and can be detachably mounted on an outer exposed portion described later.

As still another configuration of the circuit breaking part, it is possible to use a powder packed element to which a principle of a vehicle-use air bag is applied. The powder packed element is used for physically breaking a circuit in such a manner that, when an abnormal state of the energy storage device 100 is detected, an electric signal is transmitted to the powder packed element so that powder in the powder packed element is exploded, and a conductive portion in the powder packed element is broken using explosive power of the powder. The powder packed element can be detachably mounted on the outer exposed portion described later.

The above-mentioned relay and FET are respectively formed of a breaking element which can be restored by an electric signal after the relay or the FET is broken in an abnormal state. In this embodiment, the relay and the FET can be exchanged when a defect occurs on such a breaking element.

As has been described above, in this embodiment, not only a fuse or the above-mentioned fusing breakable metal member which makes use of breaking by fusing using heat but also a relay, an FET which are respectively formed of a breaking element using an electric signal, and the above-mentioned powder packed element can be used as the circuit breaking part.

In this embodiment, the energy storage apparatus 1 includes a plurality of energy storage devices 100. However, it is sufficient that the energy storage apparatus 1 includes at least one energy storage device 100. Further, the energy storage apparatus 1 may include, besides the above-mentioned constitutional elements, a control printed circuit board for monitoring and controlling a state of respective energy storage devices 100 and the like, for example. However, the illustration and the description of these other constitutional elements are omitted.

The outer case 10 is a rectangular-shaped (box-shaped) container (module case), holds objects to be accommodated such as a plurality of energy storage devices 100 at predetermined positions, and has a function of protecting these objects to be accommodated from an impact or the like. The outer case 10 is made of an insulating resin such as polycarbonate or polypropylene (PP), for example.

To be more specific, the outer case 10 includes an outer case body 12 which accommodates the energy storage devices 100, and a lid body 11 which is arranged so as to close an opening of the outer case body 12. A peripheral edge of the opening of the outer case body 12 and a peripheral edge of the lid body 11 are joined to each other by a technique such as welding so as to maintain the gas tightness.

Further, an opening portion may be formed on the outer case 10. Such an opening portion is provided for releasing a gas (exhaust gas) discharged from a gas release valve (not shown in the drawing) of the energy storage device 100 to the outside of the outer case 10 when the gas release valve is opened. Such an opening portion may be formed of a portion of the outer case body 12 and a portion of the lid body 11. The outer case 10 may be configured such that the peripheral edge of the opening of the outer case body 12 and the peripheral edge of the lid body 11 are joined to each other except for the opening portion.

The outer case body 12 is a member which constitutes the body of the outer case 10. The outer case body 12 has a bottomed rectangular cylindrical shape, and an upper surface of the outer case body 12 is opened. The lid body 11 is a member which constitutes a lid of the outer case 10, and the positive electrode external terminal 20 and the negative electrode external terminal 30 are mounted on the lid body 11. The energy storage apparatus 1 charges an electricity therein from the outside and discharges an electricity to the outside through the positive electrode external terminal 20 and the negative electrode external terminal 30. The positive electrode external terminal 20 and the negative electrode external terminal 30 are described in detail later.

The lid body 11 includes: a recessed portion 10A which accommodates the fuse 40; and a lid portion 13 which closes an opening of the recessed portion 10A. That is, the fuse 40 is disposed in a space formed by the recessed portion 10A, and the space is closed by the lid portion 13. A member on which the recessed portion 10A and the lid portion 13 are formed is not limited to the lid body 11, and the recessed portion 10A and the lid portion 13 may be formed on other members such as the outer case body 12 which constitutes the outer case 10.

The fuse 40 includes a fuse body portion 121, and two fuse connection portions 122 arranged on both ends of the fuse body portion 121, for example. The fuse body portion 121 has: a conductor which is broken by fusing when a rated electric current or more flows due to external short-circuiting of the energy storage apparatus 1 or the like; and a case which covers the conductor. The respective fuse connection portions 122 are conductive members connected to end portions of the conductor. In this embodiment, the fuse connection portions 122 are respectively formed of a flat-plate-like member in which a through hole 122a is formed.

In the fuse 40 having the above-mentioned configuration, the fuse connection portions 122 on both ends are usually conductive with each other due to the conductor of the fuse body portion 121. However, when a rated electric current or more flows in the fuse 40, the fuse connection portions 122 on both ends are brought into a non-conductive state due to breaking by fusing of the conductor. The fuse 40 is detachably mounted. The structure of a detachably mounting portion of the fuse 40 and the structure around the detachably mounting portion are described later.

It is sufficient that the fuse 40 has a conductor which is broken by fusing when a rated electric current or more flows, and the fuse 40 is not limited to the above-mentioned configuration. For example, the fuse 40 may be configured such that two fuse connection portions 122 are disposed below the fuse body portion 121 or may be configured such that the fuse connection portion 122 is formed into a rod shape.

The recessed portion 10A is formed in an indented manner from an outer peripheral surface of the lid body 11, and the opening of the recessed portion 10A is closed by the lid portion 13. That is, the recessed portion 10A is disposed so as to open toward the outside of the energy storage apparatus 1 (opens toward an outer side of the outer case 10). Accordingly, by releasing the closure of the opening of the recessed portion 10A by opening the lid portion 13, the fuse 40 accommodated in the recessed portion 10A can be exchanged without separating the lid body 11 and the outer case body 12 from each other.

The lid portion 13 is a member which closes the opening of the recessed portion 10A in an openable and closable manner. In this embodiment, the lid portion 13 is fixed to the lid body 11 by screws 13a. That is, in a state where the lid portion 13 closes the opening of the recessed portion 10A, the lid portion 13 covers the fuse 40 and exposed portions 131A, 132A (outer exposed portions) of the bus bar 50 described later. For example, a sealing member such as a rubber gasket may be mounted on a lower-surface-side peripheral edge portion of the lid portion 13, and sealing may be provided between the lid portion 13 and the peripheral edge of the opening of the recessed portion 10A in such a manner that the lid portion 13 is fixed by the screws 13a so that the sealing member is pressed by the lid portion 13 and the peripheral edge of the opening of the recessed portion 10A. With such a configuration, liquid tightness in the inside of the recessed portion 10A which is closed by the lid portion 13 is maintained. That is, it is preferable that the lid portion 13 cover (seal) the fuse 40 and the outer exposed portions liquid-tightly at the time of closing the opening of the recessed portion 10A.

A technique of closing the opening of the recessed portion 10A in an openable and closable manner by the lid portion 13 is not limited to the fixing by the screws 13a. For example, the lid portion 13 and the peripheral edge portion of the opening of the recessed portion 10A may be fixed to each other by locking, fitting or the like. Further, the opening of the recessed portion 10A may be closed in an openable and closable manner by inserting the lid portion 13 in a sliding manner along the outer peripheral surface of the lid body 11.

The bus bar 50 (bus bar 134) is a conductive plate-like member which connects electrode terminals of the neighboring energy storage devices 100 to each other. In this embodiment, four energy storage devices 100 (energy storage devices 101 to 104) are connected in series by three bus bars 134. That is, the bus bar 134 connects a positive electrode terminal of one energy storage device 100 and a negative electrode terminal of another energy storage device 100 disposed adjacently to the one energy storage device 100 to each other. For example, the bus bar 134 connects the negative electrode terminal of the energy storage device 101 and the positive electrode terminal of the energy storage device 102 to each other. Further, one of energy storage devices 100 on both ends out of the energy storage devices 100 connected in series (in FIG. 3, the energy storage device 101 in a most minus side in a Y axis direction) and the positive electrode external terminal 20 are connected to each other, and the other of the energy storage devices 100 on both ends (in FIG. 3, the energy storage device 104 on a most plus side in the Y axis direction) and the negative electrode external terminal 30 are connected to each other.

The bus bar 50 including a portion which forms the positive electrode external terminal 20 (bus bar 133 described later) and the bus bars 50 respectively including a portion which forms the negative electrode external terminal 30 (bus bars 131, 132) are integrally formed with the resin-made lid body 11 by insert molding. With such a configuration, gas tightness at portions of the lid body 11 where two external connection terminals (the positive electrode external terminal 20 and the negative electrode external terminal 30) are exposed is maintained.

The bus bar 133 which is formed in the lid body 11 by insert molding and forms a portion of the positive electrode external terminal 20 and the bus bar 131 which is formed in the lid body 11 by insert molding and forms a portion of the negative electrode external terminal 30 are respectively connected to the energy storage devices 100 disposed on both ends through the openings formed on an upper surface of the lid body 11 in a state where the lid body 11 is disposed on the outer case body 12.

The openings are respectively sealed by closing plates 11c, 11d after the above-mentioned fastening. With such a configuration, the intrusion of water and the like into the inside of the outer case 10 through these openings is prevented. Configurations of the positive electrode external terminal 20, the negative electrode external terminal 30, and the bus bars 131 to 133 are described in detail later.

The energy storage device 100 is a secondary battery (battery cell) which can charge or discharge electricity. To be more specific, the energy storage device 100 is a nonaqueous electrolyte secondary battery such as a lithium ion secondary battery. The energy storage device 100 includes a flat-shaped container 110, and the positive electrode terminal 120 and the negative electrode terminal 130 which are disposed on the container 110. The energy storage device 100 is not limited to the nonaqueous electrolyte secondary battery, and may be a secondary battery other than the nonaqueous electrolyte secondary battery, or may be a capacitor.

In the energy storage device 100, an electrode assembly, a positive electrode current collector which connects the electrode assembly and the positive electrode terminal 120 to each other, and a negative electrode current collector which connects the electrode assembly and the negative electrode terminal 130 to each other are disposed in the container 110. A liquid such as an electrolyte solution is sealed in the container 110.

The container 110 is formed of a bottomed container body made of metal and having a rectangular cylindrical shape; and a metal-made container lid portion which closes an opening of the container body. The container 110 is configured such that the inside of the container 110 can be hermetically sealed by joining the container lid portion and the container body to each other by welding or the like after the electrode assembly and the like are accommodated in the inside of the container 110.

An electrolyte solution filling plug for sealing an electrolyte solution in the inside of the container 110, a gas release valve for releasing a pressure in the container 110 when a pressure in the container 110 is elevated, and the like are provided to the container 110. However, illustrations of these constitutional elements are omitted.

The electrode assembly which the energy storage device 100 includes is a winding-type electrode assembly formed by winding a positive electrode, a negative electrode, and a separator which are disposed in a layered manner such that the separator is sandwiched between the positive electrode and the negative electrode, for example. The electrode assembly is not limited to a winding type electrode assembly and may be a stacked-type electrode assembly where flat-plate-like electrode plates are stacked to each other, for example.

The positive electrode is an electrode plate where a positive active material layer is formed on a surface of an elongated strip-shaped conductive positive current collecting foil made of aluminum, an aluminum alloy or the like. The negative electrode is an electrode plate where a negative active material layer is formed on a surface of an elongated strip-shaped conductive negative current collecting foil made of copper, a copper alloy or the like. The separator is a microporous sheet.

As materials for forming the positive electrode, the negative electrode and the separator which are used in the energy storage device 100, known materials can be suitably used provided that performance of the energy storage device 100 is not impaired. Also with respect to an electrolyte solution (nonaqueous electrolyte) sealed in the container 110, a kind of the electrolyte solution is not particularly limited and various kinds of electrolyte solutions can be selected provided that performance of the energy storage device 100 is not impaired.

The positive electrode terminal 120 and the negative electrode terminal 130 are metal-made electrode terminals for discharging electricity stored in the electrode assembly accommodated in the container 110 to an external space outside the energy storage device 100 and for introducing electricity into an internal space in the energy storage device 100 for storing electricity in the electrode assembly.

In this embodiment, on the respective positive electrode terminal 120 and the negative electrode terminal 130, a bolt for connecting the positive electrode terminal 120 and a bolt for connecting the negative electrode terminal 130 to the bus bar 50 are disposed. The positive electrode terminal 120 and the bus bar 50 and the negative electrode terminal 130 and the bus bar 50 are respectively fastened to each other using the bolt and a nut.

Here, the external connection terminals (the positive electrode external terminal 20 and the negative electrode external terminal 30) are formed in the outer case 10 by insert molding. To be more specific, the external connection terminals are formed in the lid body 11 by insert molding. In this embodiment, the bus bars 50 which connect the electrode terminals (the positive electrode terminal 120, the negative electrode terminal 130) of the energy storage devices 100 or the external connection parts of the external connection terminals described later to the fuse 40 are formed in the outer case 10 by insert molding (integrally formed with the outer case 10). To be more specific, the bus bars 50 are formed in the outer case 10 by insert molding at positions which opposedly face the electrode terminals of the energy storage devices 100. The bus bars 50 are formed in the lid body 11 by insert molding (integrally formed with the lid body 11). Hereinafter, such a configuration is described in detail.

Figure 4:
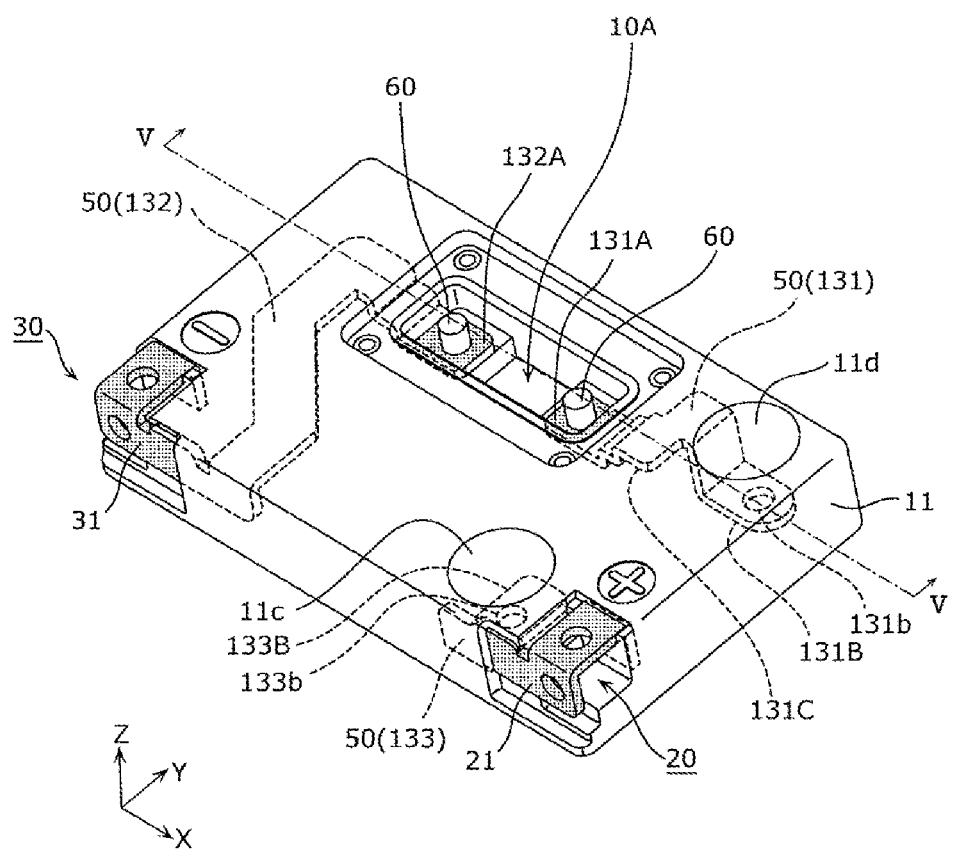
FIG. 4 is a perspective view showing configurations of a lid body and bus bars of the embodiment.
Figure 5:
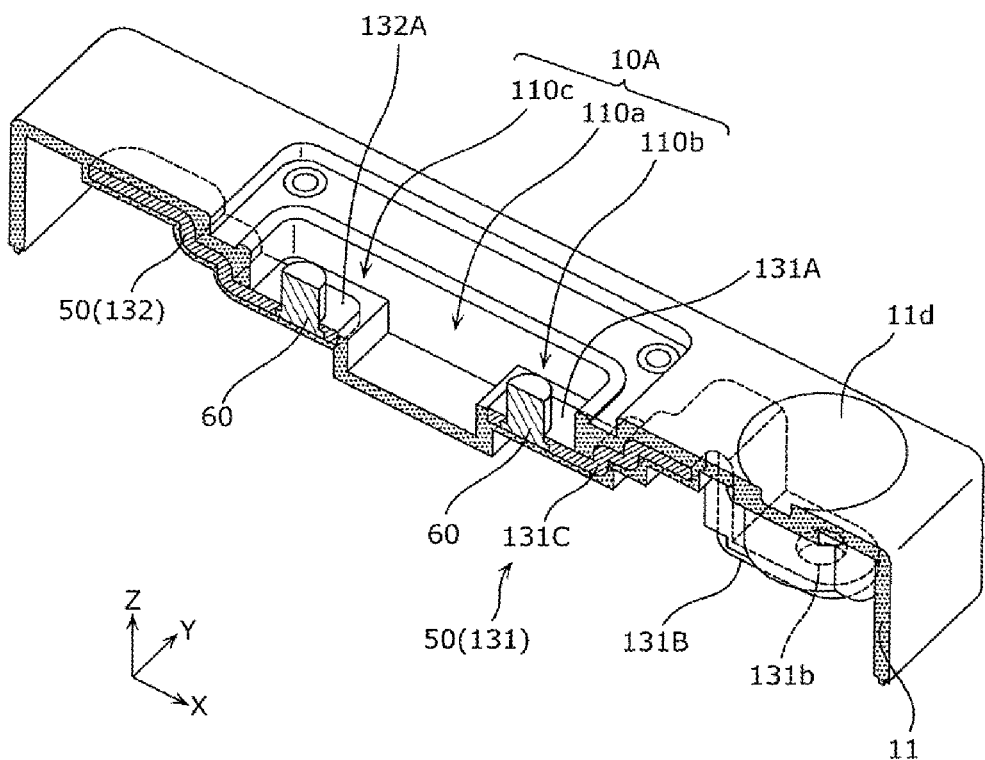
FIG. 5 is a cross-sectional view taken along line V-V in FIG. 4.

FIG. 4 is a perspective view showing the configuration of the lid body 11 according to this embodiment and configurations of the bus bars 50 (bus bars 131 to 133) formed in the lid body 11 by insert molding. FIG. 5 is a cross-sectional view taken along line V-V in FIG. 4. In FIG. 4, although portions of the bus bars 50 exposed from the lid body 11 are shown by applying dot hatching, hatching is omitted with respect to portions of the bus bars 50 exposed from a back surface of the lid body 11 (a surface on a minus side in a Z axis direction).

As shown in FIG. 4 and FIG. 5, the positive electrode external terminal 20 includes: an external connection part 21 which is connected to an external conductive member; and the bus bar 133. The negative electrode external terminal 30 includes; an external connection part 31 which is connected to an external conductive member; and the bus bars 131, 132. The fuse 40 is disposed between the bus bar 131 and the bus bar 132. The bus bars 50 which are formed in the lid body 11 by insert molding respectively include the exposed portion exposed from the outer case 10. That is, the bus bars 50 (bus bars 131 to 133) which are formed in the lid body 11 by insert molding are covered by the lid body 11 such that a portion of each bus bar 50 is exposed from the lid body 11. These bus bars 50 and the lid body 11 are formed by pouring a resin for forming the lid body 11 into a mold in a state where the bus bars 50 are inserted into the mold at the time of manufacturing the lid body 11. In such molding, to prevent predetermined portions of the bus bars 50 from being covered by the resin, the predetermined portions are brought into contact with the mold. Alternatively, such predetermined portions may be projected from the mold so that the portions are formed as the exposed portions which are exposed from the lid body 11.

Hereinafter, the configurations of the respective bus bars 50 (bus bars 131 to 133) which are formed in the lid body 11 by insert molding are described in detail.

The bus bar 131 is a conductive member which connects the electrode terminal of the energy storage device 100 (the negative electrode terminal 130 of the energy storage device 104) and the fuse 40 to each other. The bus bar 131 includes an exposed portion 131A which is exposed from the lid body 11. The exposed portion 131A is disposed on one of end portions of the bus bar 131, and is detachably connected to the fuse 40. To be more specific, the exposed portion 131A is detachably connected to one of the fuse connection portions 122 of the fuse 40. In this embodiment, the exposed portion 131A is detachably fastened to the fuse connection portion 122 by a fastening portion 60. That is, the exposed portion 131A is an outer exposed portion to which the fuse 40 can be detachably mounted from the outside of the outer case 10.

With such a configuration, the bus bar 131 and the fuse 40 are connected to each other in a state where the exposed portion 131A and the fuse connection portion 122 are brought into face contact with each other and hence, a resistance due to a connection can be suppressed.

The exposed portion 131A is disposed on the surface of the outer case 10 on a side (a plus side in the Y axis direction) opposite to a position (a minus side in the Y axis direction) where the external connection part 21 of the positive electrode external terminal 20 and the external connection part 31 of the negative electrode external terminal 30 are disposed. Further, while the external connection parts 21, 31 are disposed on both end sides in the X axis direction respectively, the exposed portion 131A is disposed at a center portion in the X axis direction. The same goes also for the exposed portion 132A of the bus bar 132.

The bus bars 131, 132 are disposed along two sides (a side along the X axis direction and a side along the Y axis direction) of the lid body 11 as viewed in a top plan view of the lid body 11. By adopting such a configuration, in the configuration where the external connection part 21 and the external connection part 31 are disposed in a direction (X axis direction) orthogonal to the direction (Y axis direction) along which the plurality of energy storage devices 100 are arranged, the bus bars 131, 132 can be routed in the inside of the lid body 11, and the fuse 40 can be disposed between the bus bars 131, 132. Accordingly, it is possible to effectively make use of a space in the lid body 11.

Although the fuse 40 and the exposed portion 131A are detachably connected to each other by fastening by the fastening portion 60 in this embodiment, the connection of the fuse 40 and the exposed portion 131A is not limited to such a configuration. For example, the fuse 40 and the exposed portion 131A may be detachably connected to each other by locking using a locking pawl or the like formed on the fuse 40 or the exposed portion 131A or may be detachably connected to each other using a fitting portion formed on the fuse 40 or the exposed portion 131A. Alternatively, the fuse 40 and the exposed portion 131A may be detachably connected to each other by binding the fuse 40 and the exposed portion 131A in the vertical direction (Z axis direction) using a binding member which is provided as a part separate from the fuse 40 and the bus bar 131.

In this embodiment, the bus bar 131 further includes an exposed portion 131B which is exposed from a back surface of the lid body 11 and is connected to an upper surface (a surface on a plus side in the Z axis direction) of the negative electrode terminal 130 of the energy storage device 104. That is, the exposed portion 131B is an inner exposed portion which is exposed to the inside of the outer case 10 at a position shifted from the exposed portion 131A (outer exposed portion) as viewed in a top plan view of the lid body 11. Here, "as viewed in a top plan view" means that the lid body 11 is viewed in a perspective view from the outside along a direction that the opening of the outer case body 12 opens (Z axis direction).

With such a configuration, the bus bar 131 and the negative electrode terminal 130 of the energy storage device 104 can be connected to each other in a state where the exposed portion 131B and the negative electrode terminal 130 are brought into face contact with each other and hence, a resistance due to a connection can be suppressed. The bus bar 131 may be connected to the negative electrode terminal 130 of the energy storage device 104 by other conductive member without being exposed from the back surface of the lid body 11.

In this embodiment, a through hole 131b is formed in the exposed portion 131B below the closing plate 11d, and the exposed portion 131B and the negative electrode terminal 130 of the energy storage device 104 are fastened to each other using a bolt which is inserted into the through hole 131b and a nut in a state where the lid body 11 is disposed on the outer case body 12. The bolt is a bolt disposed on the negative electrode terminal 130 of the energy storage device 104, for example. Since the exposed portion 131B and the negative electrode terminal 130 are fastened to each other in this manner, the lid body 11 which is integrally formed with the bus bar 131 by insert molding is fastened to the energy storage device 104. A technique of fastening the exposed portion 131B and the negative electrode terminal 130 to each other is not limited to fastening by a bolt and a nut.

The bus bar 131 includes a connection plate portion 131C which is a plate-like portion between the exposed portion 131A (outer exposed portion) and the exposed portion 131B (inner exposed portion). That is, the connection plate portion 131C is a portion which is formed in the outer case 10 by insert molding and connects the exposed portion 131A and the exposed portion 131B to each other. In this manner, the connection plate portion 131C is not exposed to the inside of the outer case 10. Here, "is not exposed" also includes a case where the connection plate portion 131C is completely formed in the outer case 10 by insert molding and a case where although most portion of the connection plate portion 131C is formed in the outer case 10 by insert molding, the connection plate portion 131C is slightly exposed to the inside of the outer case 10. For example, when a bolt terminal is adopted as an electrode terminal of the energy storage device 100, a case where the connection plate portion 131C is exposed to the inside of the outer case 10 through a hole having a diameter smaller than a bolt diameter of the bolt terminal or the like is also included in the "is not exposed".

The bus bar 132 is a conductive member which connects the external connection part 31 of the negative electrode external terminal 30 and the fuse 40 to each other, and includes the exposed portion 132A which is exposed from the lid body 11. The exposed portion 132A is disposed on one end portion of the bus bar 132, and is detachably connected to the fuse 40. To be more specific, the exposed portion 132A is detachably connected to the other fuse connection portion 122 of the fuse 40. In this embodiment, the exposed portion 132A is detachably fastened to the fuse connection portion 122 by the fastening portion 60. That is, the exposed portion 132A is an outer exposed portion on which the fuse 40 can be detachably mounted from the outside of the outer case 10 in the same manner as the exposed portion 131A.

With such a configuration, the bus bar 132 and the fuse 40 can be connected to each other in a state where the exposed portion 132A and the fuse connection portion 122 are brought into face contact with each other and hence, a resistance due to a connection can be suppressed. A technique of connecting the fuse 40 and the exposed portion 132A is not limited to the detachable connection by fastening using the fastening portion 60 in the same manner as the technique of connecting the fuse 40 and the exposed portion 131A.

In this embodiment, the bus bar 132 is integrally formed with the external connection part 31. That is, the bus bar 132 and the external connection part 31 are not provided as elements separate from each other and are formed as one member (part). To be more specific, a conductive member which constitutes the bus bar 132 has: the exposed portion 132A to which the fuse 40 is detachably connected on one end portion thereof; and the external connection part 31 which is an exposed portion for charging electricity from the outside of the energy storage apparatus 1 and discharging electricity to the outside of the energy storage apparatus 1 on the other end portion thereof.

A size of a cross-sectional area of the bus bar 132 is set equal to or larger than a cross-sectional area of the external connection part 31 of the negative electrode external terminal 30. When the cross-sectional area of the bus bar 132 and the cross-sectional area of the external connection part 31 are not set to fixed values, there may be provided a portion where a cross-sectional area of the bus bar 132 is smaller than a cross-sectional area of the external connection part 31. However, it is preferable that a minimum value of the cross-sectional area of the bus bar 132 be equal to or more than a maximum value of the cross-sectional area of the external connection part 31.

The bus bar 133 is a conductive member which connects the positive electrode terminal 120 of the energy storage device 101 and the external connection part 21 of the positive electrode external terminal 20 to each other, and is a conductive member having one end thereof connected to an upper surface (a surface on a plus side in the Z axis direction) of the positive electrode terminal 120 of the energy storage device 101 and the other end thereof connected to the external connection part 21.

In this embodiment, the bus bar 133 includes an exposed portion 133B (inner exposed portion) which is exposed from the back surface of the lid body 11 and is connected to the upper surface of the positive electrode terminal 120 of the energy storage device 101. With such a configuration, the bus bar 133 and the positive electrode terminal 120 of the energy storage device 101 can be connected to each other in a state where the exposed portion 133B and the positive electrode terminal 120 are brought into face contact with each other and hence, a resistance due to a connection can be suppressed. The bus bar 133 may be connected to the positive electrode terminal 120 of the energy storage device 101 by other conductive member without being exposed from the back surface of the lid body 11.

In this embodiment, a through hole 133b is formed in the exposed portion 133B below the closing plate 11c, and the exposed portion 133B and the positive electrode terminal 120 of the energy storage device 101 are fastened to each other using a bolt which is inserted into the through hole 133b and a nut in a state where the lid body 11 is disposed in the outer case body 12. The bolt is a bolt disposed on the positive electrode terminal 120 of the energy storage device 101, for example. Since the exposed portion 133B and the positive electrode terminal 120 are fastened to each other in this manner, the lid body 11 which is integrally formed with the bus bar 133 by insert molding is fastened to the energy storage device 101. A technique of fastening the exposed portion 133B and the positive electrode terminal 120 to each other is not limited to fastening by a bolt and a nut.

In this embodiment, the bus bar 133 is integrally formed with the external connection part 21 of the positive electrode external terminal 20. That is, the bus bar 133 and the external connection part 21 are not provided as elements separate from each other and are formed as one member (part). To be more specific, a conductive member which constitutes the bus bar 133 has an external connection part 21 which is an exposed portion for charging electricity from the outside of the energy storage apparatus 1 and discharging electricity to the outside of the energy storage apparatus 1 on one end portion thereof.

A size of a cross-sectional area of the bus bar 133 is set equal to or larger than a cross-sectional area of the external connection part 21. In the same manner, a size of a cross-sectional area of the bus bar 131 is set equal to or larger than a cross-sectional area of the external connection part 21. When the cross-sectional areas of the bus bar 133 and the external connection part 21 are not set to fixed values, there may be provided a portion where the cross-sectional area of the bus bar 133 is smaller than the cross-sectional area of the external connection part 21. However, it is preferable that a minimum value of the cross-sectional area of the bus bar 133 be equal to or more than a maximum value of the cross-sectional area of the external connection part 21. The same goes also for the bus bar 131.

These bus bars 131 to 133 are respectively formed by bending a plate-like conductive member by press working, for example. A conductive member for forming the bus bars 131 to 133 is not limited to a plate-like member, and may be a solid or hollow rod-like member or the like, for example. However, by using the plate-like member, press working or the like can be facilitated and hence, manufacturing efficiency can be enhanced. By using the plate-like member in forming the bus bar, the bus bar is connected to the fuse 40 and the electrode terminal (positive electrode terminal 120, negative electrode terminal 130) of the energy storage device 100 in a state where the bus bar is brought into face contact with the fuse 40 and the electrode terminal. Accordingly, a resistance due to a connection can be suppressed.

The bus bars 131 to 133 are formed in the lid body 11 by insert molding and hence, portions of the bus bars 131 to 133 other than predetermined positions such as the exposed portions 131A, 131B, 132A and 133B are covered by a resin which forms the lid body 11. Accordingly, an insulation can be ensured between the bus bars 131 to 133 and the energy storage devices 100 by the lid body 11.

The bus bars 131 to 133 which are conductive members are made of aluminum, for example. However, a material for forming the bus bars 131 to 133 is not particularly limited. All bus bars 131 to 133 may be made of the same material or any one of the bus bars 131 to 133 may be made of a material different from a material for forming remaining bus bars. Each of the bus bars 131 to 133 may be formed of one member or may be formed of a plurality of members. The same goes also for the bus bar 134.

In this manner, in this embodiment, in each of the members which form the bus bars 131, 132 respectively, a longitudinally intermediate portion of the member is inserted into the lid body 11, and both end portions of the member extend from the lid body 11. Although the detail of the members is described in detail later, one end portion of each of the above-mentioned members which is fixed (connected) to the fuse 40 extends from a wall surface of the recessed portion 10A, and a portion to which the fuse 40 is fixed is disposed horizontally.

To be more specific, the bus bars 131, 132 respectively have the exposed portions 131A, 132A exposed from the lid body 11. The fuse 40 is detachably connected to the exposed portions 131A, 132A by fastening using the fastening portions 60.

The fastening portions 60 are members such as bolts which fasten the fuse 40 to the exposed portions 131A, 131B in a detachable manner. The fastening portions 60 are inserted into the through holes 122a (see FIG. 2) formed in the fuse 40 and are fastened by nuts or the like.

In this embodiment, the fastening portion 60 has a swaged portion on an end portion thereof (an end portion on a minus side in the Z axis direction) on a back surface side of the lid body 11, and the swaged portion is made to pass through the through hole formed in the bus bar 131 or the bus bar 132 and is swaged and hence, the fastening portion 60 is integrally formed with the bus bar 131 or the bus bar 132. The swaged portion is formed in the resin-made lid body 11 by insert molding together with the bus bar 131 or the bus bar 132. That is, a portion of the fastening portion 60 is formed in the lid body 11 by insert molding.

To be more specific, the fastening portion 60 is swaged in a state where the fastening portion 60 is inserted into the through hole formed in the bus bar 131 in the exposed portion 131A or in a state where the fastening portion 60 is inserted into the through hole formed in the bus bar 132 in the exposed portion 132A.

Since the fastening portion 60 is fastened in this manner, the fastening portion 60 and the bus bar 131 or 132 can be firmly connected to each other. Further, a step of connecting the fastening portion 60 and the bus bar 131 or 132 can be simplified.

In this embodiment, the fastening portion 60 is configured such that a portion of the fastening portion 60 is formed in the lid body 11 by insert molding so as to prevent the fastening portion 60 from being exposed to the back surface side of the lid body 11. With such a configuration, even when the energy storage apparatus 1 includes the fastening portions 60 which are formed in the lid body 11 by insert molding, the energy storage apparatus 1 can maintain a gas tightness in a space where the energy storage devices 100 are disposed.

In this embodiment, the fastening portion 60 is integrally formed with the bus bar 131 or the bus bar 132 and hence, rigidity of the bus bars 131, 132 and the fastening portions 60 can be enhanced as a whole. The fastening portion 60 may be formed as a part separate from the bus bar 131 or the bus bar 132. However, the bus bars 131, 132 and the fastening portions 60 are portions to which a load is likely to be applied at the time of mounting or dismounting the fuse 40. Accordingly, from a viewpoint of suppressing the occurrence of drawbacks such as a damage or a deformation of a portion where the fuse 40 is mounted or dismounted, it is preferable that the fastening portion 60 and the bus bar 131, and the fastening portion 60 and the bus bar 132 be integrally formed with each other.

A technique of integrally forming the fastening portion 60 and the bus bar 131, 132 is not limited to swaging, and welding or the like may be adopted. However, by swaging the end portion of the fastening portion 60 on a back surface side of the lid body 11, it is possible to prevent the fastening portion 60 from projecting toward the back surface side of the lid body 11 and hence, the fastening portion 60 is minimally exposed to the back surface side of the lid body 11. Accordingly, gas tightness of the space where the energy storage devices 100 are disposed can be maintained.

Next, the configurations of the bus bars 131, 132 at the recessed portion 10A and the peripheral portion around the recessed portion 10A are described in detail while also describing a shape of the recessed portion 10A.

As shown in FIG. 4 and FIG. 5, in this embodiment, the bus bars 131, 132 are bent along the shape of the recessed portion 10A on the peripheral portion of the recessed portion 10A. That is, the bus bars 131, 132 are bent following a recess in the recessed portion 10A.

In this embodiment, the recessed portion 10A is a recessed portion having, for example, a rectangular-shaped opening where a cross-sectional shape in a predetermined direction (X axis direction) is formed into a stepwise shape. To be more specific, the recessed portion 10A includes: a deep bottom recessed portion 110a at a center portion in the X axis direction, and shallow bottom recessed portions 110b, 110c which are disposed on both sides of the deep bottom recessed portion 110a in the X axis direction, and have bottom surfaces shallower than a bottom surface of the deep bottom recessed portion 110a. In a state where the fuse 40 is accommodated in the recessed portion 10A, the fuse body portion 121 is disposed on the deep bottom recessed portion 110a, and the fuse connection portions 122 having a thickness smaller than a thickness of the fuse body portion 121 are disposed on the shallow bottom recessed portions 110b, 110c.

In this embodiment, the bus bars 131, 132 are bent along the recessed portion 10A, the exposed portions 131A, 132A are exposed from the inner surface of the recessed portion 10A. That is, the bus bars 131, 132 are respectively formed such that one end portion of the bus bar 131, 132 extends to the center portion of the recessed portion 10A from a wall surface of the recessed portion 10A, and the exposed portion 131A, 132A which is a portion connected with the fuse 40 is disposed horizontally (in parallel to an XY plane).

To be more specific, the exposed portions 131A, 132A are exposed from a bottom surface of the recessed portion 10A. To be further more specific, the exposed portion 131A is exposed from a bottom surface of the shallow bottom recessed portion 110b, and the exposed portion 132A is exposed from a bottom surface of the shallow bottom recessed portion 110c. For example, an upper surface of the exposed portion 131A is positioned substantially coplanar with the bottom surface of the shallow bottom recessed portion 110b. Further, for example, an upper surface of the exposed portion 132A is positioned substantially coplanar with the bottom surface of the shallow bottom recessed portion 110c.

Since the exposed portions 131A, 132A are exposed from the bottom surface of the recessed portion 10A in this manner, ratios of the portions of the bus bars 131, 132 which are inserted into the lid body 11 can be increased. Accordingly, rigidity of the lid body 11 and the bus bars 131, 132 can be increased. There is no problem in exposing the exposed portions 131A, 132A from the wall surfaces of the recessed portion 10A.

A shape of the recessed portion 10A is not particularly limited. The recessed portion 10A may include a circular-shaped opening, or the recessed portion 10A may include a flat bottom surface with no stepped portion.

In this embodiment, the exposed portions 131A, 132A have an approximately rectangular shape as viewed in a top plan view (as viewed from a plus side in the Z axis direction). Accordingly, the exposed portions 131A, 132A can ensure a large contact area with the flat-plate-like fuse connection portion 122 and hence, a resistance due to a connection between the fuse 40 and the exposed portions 131A, 132A can be suppressed.

The configuration of the energy storage apparatus 1 according to this embodiment has been described heretofore. Hereinafter, advantageous effects which the above-mentioned energy storage apparatus 1 can acquire are described. Hereinafter, the description will be made with respect to advantageous effects acquired by the bus bar 132 out of the bus bars 131, 132 connected to both ends of the fuse 40 and matters relating to the bus bar 132. However, the bus bar 131 and matters relating to the bus bar 131 can acquire substantially same advantageous effects as the bus bar 132 and matters relating to the bus bar 132.

In general, a phenomenon where a conductor of a fuse is broken by melting is referred to as "fusing". Once the fuse is broken, the fuse cannot be reused due to breaking of the conductor by fusing. Accordingly, to use the energy storage apparatus provided with a fuse, it is necessary to exchange the broken fuse with a new fuse. However, in an energy storage apparatus where a fuse is exchangeable, to allow the energy storage apparatus to have a fuse exchangeable configuration, there may be a case where a bus bar has the complicated structure. Further, in general, in an energy storage apparatus, a bus bar is required to have the insulation structure for preventing the occurrence of unexpected short-circuiting.

Therefore, according to this embodiment, the bus bar 132 is formed in the outer case 10 (the lid body 11 in this embodiment) by insert molding and hence, the bus bar 132 can have the insulation structure and the simple structure. Further, in the portion (exposed portion 132A) of the bus bar 132 to which the fuse 40 is connected, the bus bar 132 formed by insert molding is exposed and hence, the fuse 40 can be exchanged. That is, according to this embodiment, it is possible to exchange the fuse 40 while allowing the bus bar 132 to have the insulation structure and the simple structure.

To be more specific, the bus bar 132 is formed in the outer case 10 by insert molding and hence, the bus bar 132 is covered by the outer case 10. Accordingly, the bus bar 132 can have the insulation structure by the outer case 10 which is made of an insulating material.

Further, the bus bar 132 is formed in the outer case 10 by insert molding and hence, it is possible to provide the configuration which enables an exchange of the fuse while allowing the bus bar 132 to have the simple structure. For example, in a case where a bus bar is not formed in the outer case 10 by insert molding, to provide a configuration which enables an exchange of a fuse, there may be a case where a plurality of conductive members are connected to each other by fastening or the like. The larger the number of such fastening portions, the larger a resistance of the bus bar becomes. Accordingly, in this embodiment, by forming the bus bar 132 in the outer case 10 by insert molding, the bus bar 132 can have the simple structure so that the number of fastening portions of a bus bar can be reduced. Accordingly, a resistance of the bus bar can be lowered.

Further, the bus bar 132 is formed in the outer case 10 by insert molding and hence, the bus bar 132 and the outer case 10 are integrally formed into one integral part. Accordingly, assembling of the energy storage apparatus 1 can be facilitated.

According to this embodiment, since the exposed portion 132A is exposed from the inner surface of the recessed portion 10A, hermetic property of the inside of the recessed portion 10A can be ensured. To be more specific, the bus bar 132 is formed in the outer case 10 by insert molding and hence, the bus bar 132 and the outer case 10 are brought into close contact with each other around the exposed portion 132A of the inner surface of the recessed portion 10A. Accordingly, gas tightness can be maintained between the bus bar 132 and the outer case 10. Further, in the case where the recessed portion 10A is opened toward the inside of the outer case 10, it is necessary to remove the outer case 10 for exchanging the fuse 40. However, the recessed portion 10A is opened toward the outside of the outer case 10 and hence, it is possible to exchange the fuse 40 without removing the outer case 10.

By bending the bus bar 132 following the recess in the recessed portion 10A, the formation of a wasteful space can be suppressed whereby space saving can be realized.

According to this embodiment, the bus bar 132 is formed in the lid body 11 by insert molding and hence, rigidity of the lid body 11 can be increased. To be more specific, the lid body 11 is reinforced by the bus bar 132 inserted into the lid body 11 and hence, rigidity of the lid body 11 is increased.

Further, according to this embodiment, the following advantageous effects can be acquired. Hereinafter, other advantageous effects which the energy storage apparatus 1 can acquire are described with reference to FIG. 6 and FIG. 7.

FIG. 6(a) and FIG. 6(b) are perspective views showing the configuration of the lid body 11 when the fuse 40 is mounted on or dismounted from the lid body 11. To be more specific, FIG. 6(a) is a perspective view showing the configuration of the lid body 11 in a state where the fuse 40 is mounted on the lid body 11, and FIG. 6(b) is a perspective view showing the configuration of the lid body 11 in a state where the fuse 40 is removed from the lid body 11. FIG. 7 is a cross-sectional view showing the configuration of the energy storage apparatus 1 in a state where the lid portion 13 is removed in this embodiment. In FIG. 7, the energy storage device 100 is shown as viewed in a side view.

In general, in an energy storage apparatus where a fuse is exchangeable, due to a load applied in mounting or dismounting the fuse at the time of exchanging the fuse, there is a possibility that a defect such as a damage or a deformation occurs on a portion where mounting or dismounting operation of the fuse is performed by repeating the exchange of the fuse.

In view of the above, according to this embodiment, the bus bar 132 is formed in the outer case 10 (the lid body 11 in this embodiment) by insert molding and hence, rigidity of the bus bar 132 and the outer case 10 can be increased while ensuring the insulation between the bus bar 132 and the energy storage device 100. Further, the fuse 40 is connected to the exposed portion 132A of the bus bar 132 which is formed by insert molding and hence, the occurrence of a damage, a deformation or the like on the energy storage apparatus 1 due to mounting and dismounting operation of the fuse 40 can be suppressed.

Figure 6:
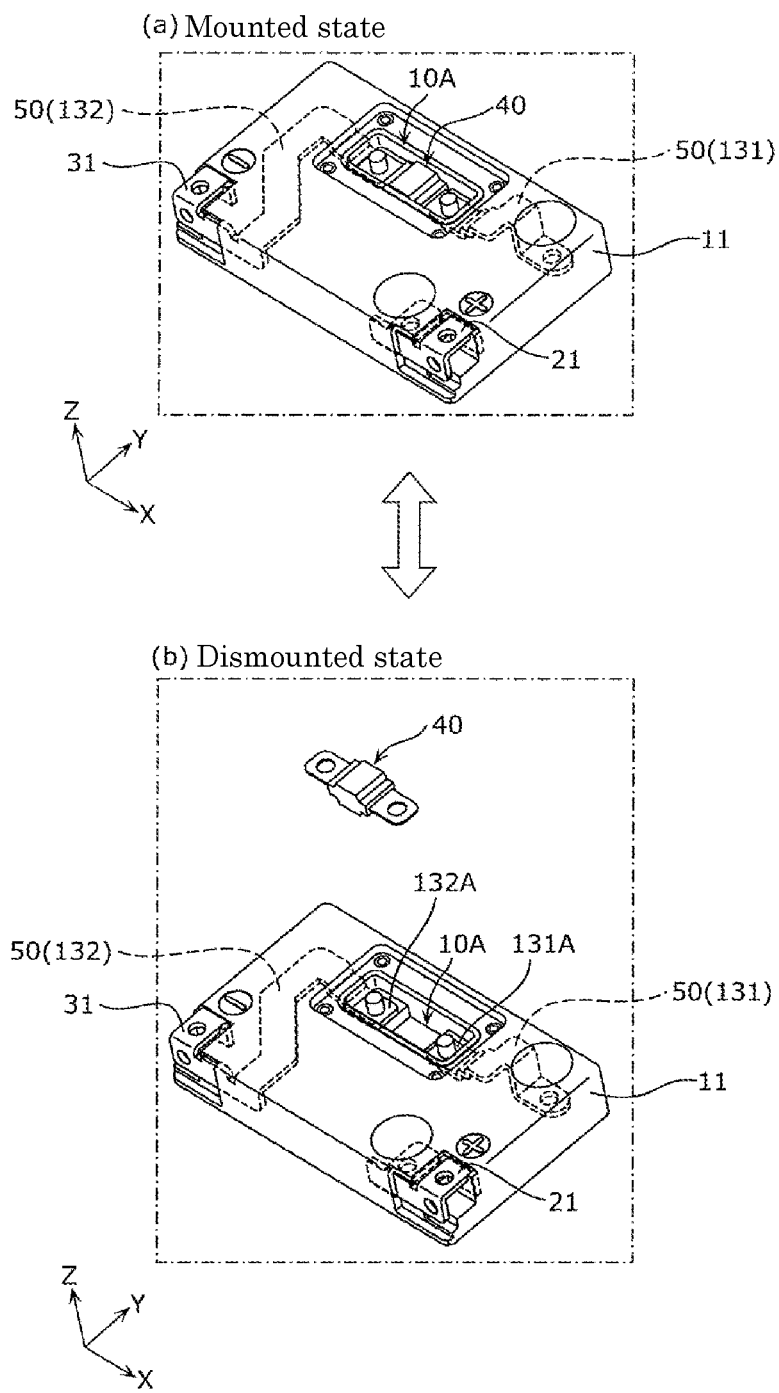
FIG. 6(a) and FIG. 6(b) are perspective views of the lid body when the fuse in the embodiment is mounted and dismounted respectively.
Figure 7:
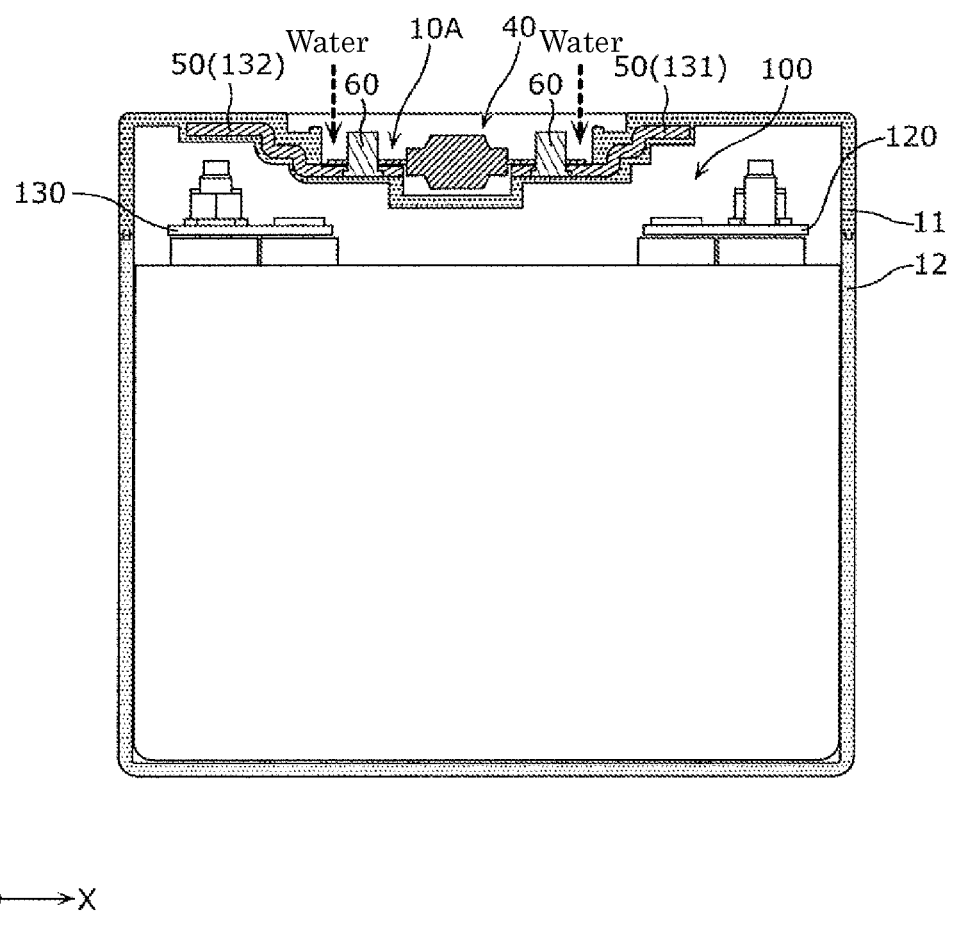
FIG. 7 is a cross-sectional view of the energy storage apparatus in a state where a lid portion of the embodiment is removed.

To be more specific, the bus bar 132 is formed in the outer case 10 by insert molding and hence, rigidity of the bus bar 132 and the outer case 10 is increased and hence, even when a state shown in FIG. 6(*a*) where the fuse 40 is mounted on the bus bar 132 and a state shown in FIG. 6(*b*) where the fuse 40 is removed from the bus bar 132 are repeated, the occurrence of a defect such as a damage or a deformation of the bus bar 132 and the outer case 10 at a portion on which the fuse 40 is mounted or from which the fuse 40 is dismounted can be suppressed.

The fuse 40 is detachably connected to the exposed portion 132A of the bus bar 132 and hence, when the exchange of the fuse 40 is necessary due to an external short-circuiting or the like of the energy storage apparatus 1, the fuse 40 can be easily exchanged.

To be more specific, according to this embodiment, the bus bar 132 is formed by insert molding in the lid body 11 which covers the opening of the outer case body 12 which accommodates the energy storage device 100, and the exposed portion 132A is exposed from the lid body 11. Since the exposed portion 132A is exposed from the lid body 11 in this manner, even in a case where the outer case body 12 is closed by the lid body 11 by welding or the like, the fuse 40 can be exchanged. Further, the bus bar 132 is formed in the lid body 11 by insert molding and hence, the bus bar 132 and the lid body 11 are brought into close contact with each other around the exposed portion 132A. Accordingly, the fuse 40 can be exchanged in a state where gas tightness of the space in which the energy storage devices 100 are disposed is maintained. That is, the fuse 40 can be easily exchanged when necessary while suppressing the intrusion of water or the like into the space where the energy storage devices 100 are disposed.

Accordingly, for example, even when the fuse 40 is exchanged in an environment shown in FIG. 7 where water or the like may be splashed on the energy storage apparatus 1, the intrusion of water into the space where the energy storage devices 100 are disposed can be suppressed. That is, according to this embodiment, the space where the energy storage devices 100 are disposed can be hermetically sealed by the gastight structure. Accordingly, the energy storage apparatus 1 according to this embodiment can be used as an energy storage apparatus which is mounted on a small-sized prime-mover-equipped device such as a battery for starting an engine of a motorcycle and is placed in an environment where rain may be fallen on the energy storage apparatus in a usual use.

According to this embodiment, the fuse 40 is accommodated in the recessed portion 10A and hence, it is possible to prevent the fuse 40 from projecting toward the outside of the outer case 10 whereby the downsizing of the energy storage apparatus 1 can be realized.

According to this embodiment, with the provision of the lid portion 13 which closes the opening of the recessed portion 10A, hermetic property of the inside of the recessed portion 10A can be ensured with more certainty thus realizing the liquid-tight structure. Accordingly, the intrusion of water or the like into the inside of the recessed portion 10A can be suppressed. That is, since the intrusion of water or the like into the space where the fuse 40 is disposed can be suppressed, adhesion of moisture to the fuse 40 can be suppressed. When moisture is adhered to the fuse 40, there may a case where a conductor of the fuse 40 which is designed to be broken by fusing when a rated current or more flows in the fuse 40 corrodes and hence, it is necessary to exchange the fuse 40 frequently. Accordingly, with the provision of the lid portion 13, the fuse 40 can be protected from water or the like and hence, frequency of exchange of the fuse 40 can be reduced.

In the energy storage apparatus 1, a load is particularly likely to be applied to a mounting/dismounting portion of the fuse 40 in mounting or dismounting the fuse 40. Accordingly, a defect such as a damage or a deformation is likely to occur particularly on the mounting/dismounting portion. Accordingly, in this embodiment, a portion of the fastening portion 60 which fastens the fuse 40 in a detachable manner is formed in the outer case 10 (the lid body 11 in this embodiment) by insert molding and hence, rigidity of the bus bar 132 and the outer case 10 at the mounting/dismounting portion can be further increased. Accordingly, the occurrence of a damage or the like on a portion of the bus bar 132 and a portion of the outer case 10 to which a load is likely to be applied in mounting or dismounting the fuse 40 can be suppressed.

According to this embodiment, a portion of the fastening portion 60 is formed in the outer case 10 by insert molding and hence, the fastening portion 60 is fixed. Accordingly, for example, positioning, a fastening operation or the like of the fuse 40 at the time of exchanging the fuse 40 can be facilitated and hence, the fuse 40 can be easily exchanged.

According to this embodiment, the bus bar 132 is integrally formed with the external connection part of the external connection terminal (the external connection part 31 of the negative electrode external terminal 30 in this embodiment) and hence, the number of parts can be reduced. Further, compared to a case where the bus bar 132 is formed as a part separate from the external connection terminal, the reduction of resistance between the bus bar 132 and the external connection terminal can be realized.

According to this embodiment, the energy storage apparatus 1 includes: a first bus bar (the bus bar 132 in this embodiment) which connects the external connection part (the external connection part 31 in this embodiment) of the external connection terminal and the fuse 40 to each other, and a second bus bar (the bus bar 131 in this embodiment) which connects the electrode terminal (the negative electrode terminal 130 of the energy storage device 104 in this embodiment) and the fuse 40 to each other. That is, the fuse 40 is disposed between the first bus bar and the second bus bar. With such a configuration, the degree of freedom in arrangement of the fuse 40 is enhanced.

According to this embodiment, the lid body 11 and the plurality of energy storage devices 100 are fixed to each other in such a manner that the bus bar 131 and the bus bar 133 which are formed in the lid body 11 by insert molding and the energy storage devices 100 on both ends of the plurality of energy storage devices 100 are fastened to each other. With such a configuration, assembling of the lid body 11 and the energy storage devices 100 can be facilitated and hence, assembling steps of the energy storage apparatus 1 can be simplified.

The connection plate portion 131C which connects the exposed portion 131A (outer exposed portion) and the exposed portion 131B (inner exposed portion) of the bus bar 131 to each other is formed in the outer case 10 by insert molding. Accordingly, it is possible to suppress short-circuiting of the bus bar 131 with other conductive members.

There is a concern about short-circuiting when the bus bar 50 is exposed at the position which oppositely faces the electrode terminal of the energy storage device 100. However, the bus bar 50 is formed in the outer case 10 by insert molding and hence, even when the bus bar 50 is disposed at a position which oppositely faces the electrode terminal, such short-circuiting can be suppressed.

There is a concern about short-circuiting when the outer exposed portion such as the exposed portion 131A and the exposed portion 132A is disposed in the vicinity of the external connection part 21, 31. However, the outer exposed portion is disposed on the side opposite to the external connection part 21, 31 and hence, such short-circuiting can be suppressed.

The bus bar 50 has a cross-sectional area equal to or larger than the cross-sectional area of the external connection part 21 or 31. Accordingly, when an electric current flows in the bus bar 50, it is possible to suppress an increase of a resistance value.

Next, the above-mentioned configurations of the positive electrode external terminal 20 and the negative electrode external terminal 30 are described in detail from a viewpoint different from the above-mentioned description using different expressions.

Figure 8:
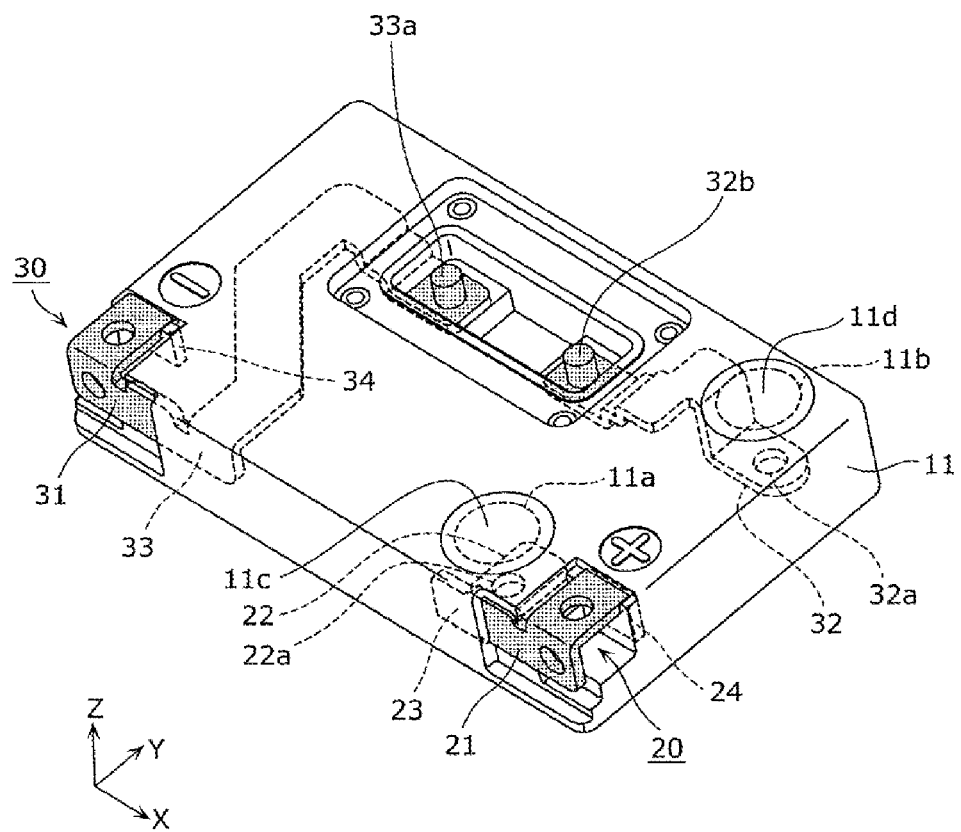
FIG. 8 is a perspective view showing configurations of a positive electrode external terminal and a negative electrode external terminal according to the embodiment.

FIG. 8 is a perspective view showing configurations of the positive electrode external terminal 20 and the negative electrode external terminal 30 according to the embodiment of the present invention. In FIG. 8, although portions of the positive electrode external terminal 20 and the negative electrode external terminal 30 exposed from the lid body 11 are shown by applying dot hatching, hatching is omitted with respect to portions of the positive electrode external terminal 20 and the negative electrode external terminal 30 exposed from the back surface of the lid body 11 (a surface on a minus side in a Z axis direction).

The positive electrode external terminal 20 and the negative electrode external terminal 30 are external connection terminals which are integrally formed with the lid body 11 by insert molding. That is, the positive electrode external terminal 20 and the negative electrode external terminal 30 are conductive members made of metal or the like, and are covered by the lid body 11 such that portions of the positive electrode external terminal 20 and the negative electrode external terminal 30 are exposed from the resin-made lid body 11.

Such a configuration is formed by pouring a resin for forming the lid body 11 in a mold in a state where the positive electrode external terminal 20 and the negative electrode external terminal 30 are inserted into the mold at the time of manufacturing the lid body 11. At this stage of operation, to prevent predetermined portions of the positive electrode external terminal 20 and the negative electrode external terminal 30 from being covered by a resin, for example, the predetermined portions are formed in an exposed manner from the lid body 11 by bringing the portions into contact with the mold, by projecting the portions from the mold or the like. With such a configuration, it is possible to maintain gas tightness at portions of the lid body 11 where the positive electrode external terminal 20 and the negative electrode external terminal 30 are exposed.

The positive electrode external terminal 20 and the negative electrode external terminal 30 formed in the lid body 11 by insert molding are respectively fastened to the energy storage devices 100 through the opening portions 11a, 11b which are formed on the upper surface of the lid body 11 in a state where the lid body 11 is disposed on the outer case body 12. These opening portions 11a, 11b are respectively sealed by the closing plates 11c, 11d after the above-mentioned fastening operation. With such a configuration, the intrusion of water or the like into the inside of the outer case 10 from these opening portions 11a, 11b can be prevented.

The positive electrode external terminal 20 includes the external connection part 21, a terminal connection part 22, a first insert part 23, and a second insert part 24. The negative electrode external terminal 30 includes the external connection part 31, a terminal connection part 32, a first insert part 33, and a second insert part 34. The fuse 40 is disposed between the terminal connection part 32 and the first insert part 33. The terminal connection part 22 and the first insert part 23 correspond to the above-mentioned bus bar 133, and the terminal connection part 22 corresponds to the exposed portion 133B. The terminal connection part 32 corresponds to the above-mentioned bus bar 131 (the exposed portions 131A, 131B and the connection plate portion 131C), and the first insert part 33 corresponds to the above-mentioned bus bar 132. That is, on both the positive electrode side and the negative electrode side, the terminal connection part and the first insert part constitute the bus bar, and are connected to the external connection part.

That is, the negative electrode external terminal 30 differs from the positive electrode external terminal 20 with respect to a point that the negative electrode external terminal 30 includes the fuse 40 between the external connection part 31 and the terminal connection part 32. However, the negative electrode external terminal 30 is similar to the positive electrode external terminal 20 with respect to other configurations. Accordingly, hereinafter, the configuration of the positive electrode external terminal 20 is described in detail, and the description of the negative electrode external terminal 30 is simplified or omitted.

Figure 9:
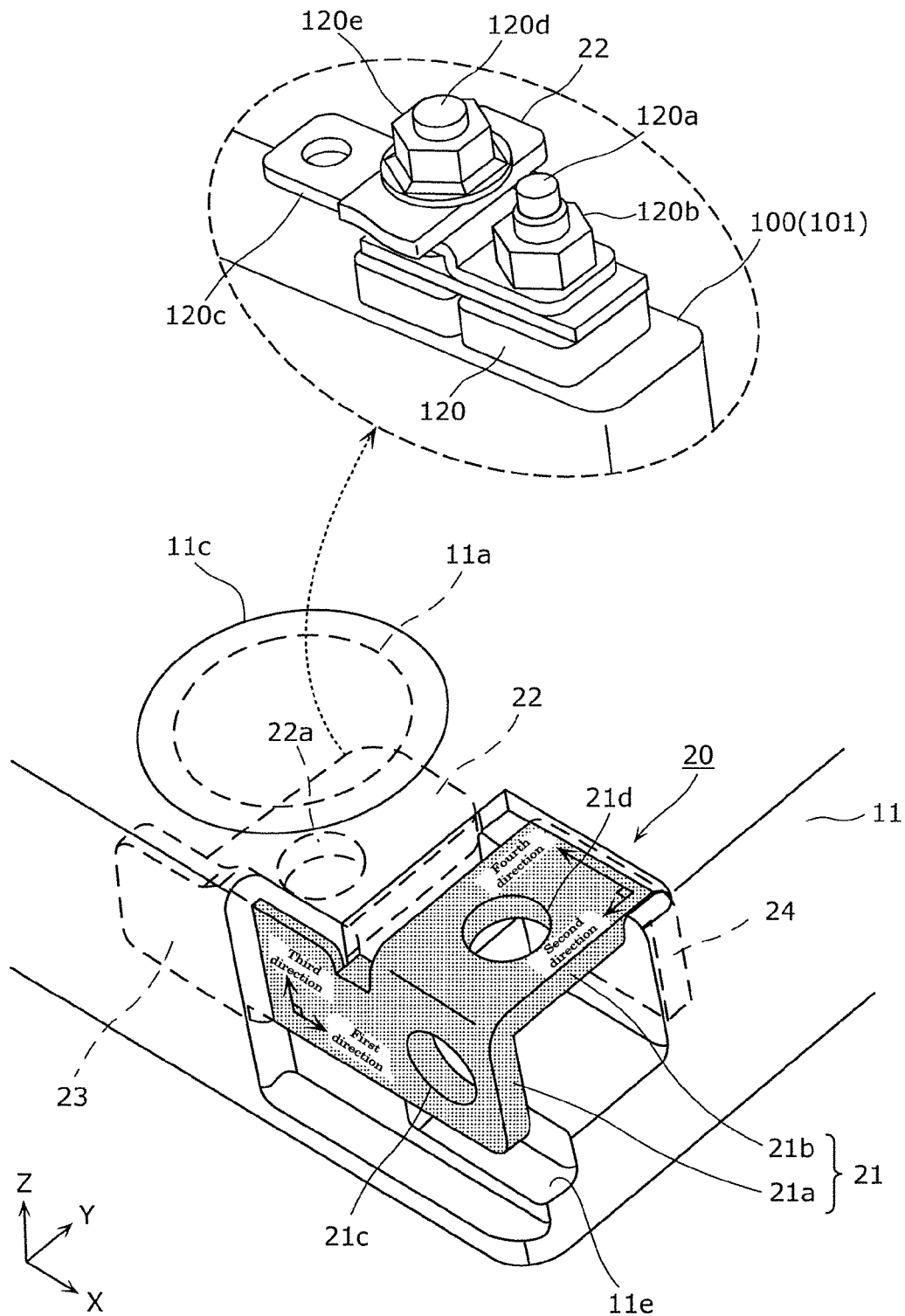
FIG. 9 is a perspective view showing the configuration of the positive electrode external terminal according to the embodiment in detail.

FIG. 9 is a perspective view showing a detail of the configuration of the positive electrode external terminal 20 according to the embodiment of the present invention. To be more specific, FIG. 9 is a perspective view showing a portion of the positive electrode external terminal 20 shown in FIG. 8 in an enlarged manner.

Figure 10:
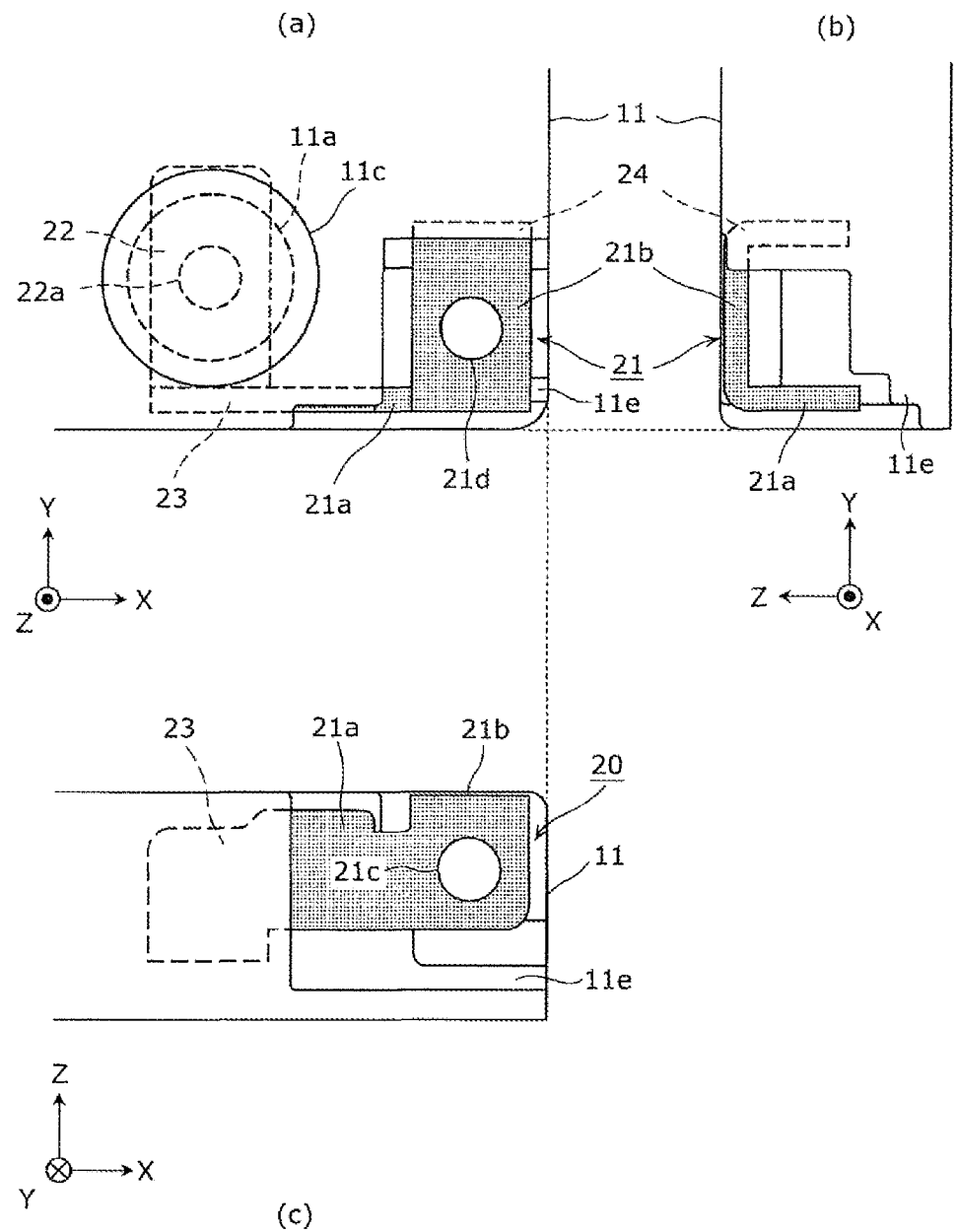
FIG. 10 is a plan view showing the configuration of the positive electrode external terminal according to the embodiment in detail.

FIG. 10(a) to FIG. 10(c) are plan views showing a detail of configuration of the positive electrode external terminal 20 according to the embodiment of the present invention. To be more specific, FIG. 10(a) is a top plan view when the positive electrode external terminal 20 shown in FIG. 9 is viewed from a plus side in the Z axis direction, FIG. 10(b) is a side view when the positive electrode external terminal 20 is viewed from a plus side in the X axis direction, and FIG. 10(c) is a side view when the positive electrode external terminal 20 is viewed from a minus side in the Y axis direction.

In these drawings, in the same manner as FIG. 8, although portions of the positive electrode external terminal 20 exposed from the lid body 11 are shown by applying dot hatching, hatching is omitted with respect to portions of the positive electrode external terminal 20 exposed from a back surface of the lid body 11 (a surface on a minus side in a Z axis direction).

As shown in these drawings, the positive electrode external terminal 20 includes the external connection part 21, the terminal connection part 22, the first insert part 23, and the second insert part 24. To be more specific, the positive electrode external terminal 20 is configured such that the external connection part 21, the terminal connection part 22, the first insert part 23, and the second insert part 24 are integrally formed with each other. That is, the external connection part 21, the terminal connection part 22, the first insert part 23, and the second insert part 24 are formed using one plate-like member. Here, the configuration "formed using one plate-like member" also includes a configuration where a plurality of plate-like members are contiguously connected to each other by welding or the like.

The external connection part 21 is a body portion of the positive electrode external terminal 20 which is connected to an external conductive member, and is disposed so as to be exposed to the outside from the lid body 11. To be more specific, the external connection part 21 has a shape formed by bending a plate-like member, and is disposed on a corner portion of the lid body 11 on a plus side in the X axis direction and in a minus side in the Y axis direction. The external connection part 21 includes a first connection portion 21a disposed on a minus side in the Y axis direction, and a second connection portion 21b disposed on a plus side in the Z axis direction.

The first connection portion 21a is a portion extending from the first insert part 23 in a first direction (in the X axis direction in this embodiment). To be more specific, the first connection portion 21a is a flat-plate-like part having a planar surface parallel to the first direction (X axis direction) and a third direction (Z axis direction in this embodiment) which is orthogonal to the first direction. That is, the first connection portion 21a is a rectangular-shaped flat-plate-like part parallel to an XZ plane. Further, one end (an end portion on a minus side in the X axis direction) of the first connection portion 21a is connected to the first insert part 23, and the other end (an end portion on a plus side in the Z axis direction) of the first connection portion 21a is connected to the second connection portion 21b.

The second connection portion 21b is a portion extended in the second direction (the Y axis direction in this embodiment) from the second insert part 24. To be more specific, the second connection portion 21b is a flat-plate-like part having a planar surface parallel to the second direction (Y axis direction) and a fourth direction (X axis direction in this embodiment) which is orthogonal to the second direction. That is, the second connection portion 21b is a rectangular-shaped flat-plate-like part parallel to an XY plane. Further, one end (an end portion on a plus side in the Y axis direction) of the second connection portion 21b is connected to the second insert part 24, and the other end (an end portion on a minus side in the Y axis direction) of the second connection portion 21b is connected to the first connection portion 21a.

In this manner, assuming an extending direction of the first connection portion 21a (X axis direction) as the first direction and assuming an extending direction (Y axis direction) of the second connection portion 21b as the second direction, a third direction (Z axis direction) which is orthogonal to the first direction in the first connection portion 21a and a fourth direction (X axis direction) which is orthogonal to the second direction in the second connection portion 21b are directions different from each other. In other words, the external connection part 21 is not configured such that both the first connection portion 21a and the second connection portion 21b are formed in an erected manner in the same direction (Z axis direction, for example).

That is, for example, when both the first connection portion 21a and the second connection portion 21b are formed in an erected manner in the Z axis direction, the third direction which is orthogonal to the first direction in the first connection portion 21a becomes the Z axis direction, and the fourth direction which is orthogonal to the second direction in the second connection portion 21b also becomes the Z axis direction. Accordingly, in this embodiment, the external connection part 21 is configured such that both the first connection portion 21a and the second connection portion 21b are not formed in an erected manner in the same direction.

In a case where both the first connection portion 21a and the second connection portion 21b are formed in an erected manner in the same direction (Z axis direction, for example), an intersecting portion between the first connection portion 21a and the second connection portion 21b is disposed in a direction (Z axis direction) orthogonal to the first direction (X axis direction) and the second direction (Y axis direction). Accordingly, in this embodiment, it is also safe to say that the intersecting portion between the first connection portion 21a and the second connection portion 21b is disposed in a direction different from the direction orthogonal to the first direction and the second direction.

In this embodiment, the third direction which is orthogonal to the first direction in the first connection portion 21a is the Z axis direction, and the fourth direction which is orthogonal to the second direction in the second connection portion 21b is the X axis direction and hence, the third direction and the fourth direction are orthogonal to each other.

From a viewpoint of firmly fixing the positive electrode external terminal 20 to the outer case 10, it is preferable that the third direction and the fourth direction be orthogonal to each other as in the case of this embodiment. However, the third direction and the fourth direction may not be orthogonal to each other. That is, the third direction is not limited to the Z axis direction, and the fourth direction is not limited to the X axis direction. For example, the third direction may be inclined with respect to the Z axis direction, or the fourth direction may be inclined with respect to the X axis direction. Further, the third direction and the fourth direction may be opposite to each other (the third direction being the X axis direction and the fourth direction being the Z axis direction).

In the same manner, it is preferable that the first direction which is the extending direction of the first connection portion 21a and the second direction which is the extending direction of the second connection portion 21b be orthogonal to each other as in the case of this embodiment. However, the first direction and the second direction may not be orthogonal to each other. That is, the first direction is not limited to the X axis direction, and the second direction is not limited to the Y axis direction. For example, the first direction may be inclined with respect to the X axis direction, or the second direction may be inclined with respect to the Y axis direction. Further, the first direction and the second direction may be the same direction (for example, both the first direction and the second direction being the X axis direction).

In the first connection portion 21a and the second connection portion 21b, through holes 21c, 21d which are used in connecting the external conductive member are formed respectively. That is, in connecting an external conductive member such as a bus bar to the positive electrode external terminal 20, a bolt is inserted into the through hole 21c or 21d, and a nut is fastened to the bolt so that the conductive member is fixed to the positive electrode external terminal 20. With such a configuration, the energy storage apparatus 1 is connected to an energy storage apparatus disposed adjacently to the energy storage apparatus 1, a power system, a power load or the like.

The through holes 21c, 21d are respectively formed of a through hole having a circular cross-sectional shape in this embodiment. However, a cross-sectional shape of the through holes 21c, 21d may be any shape provided that a conductive member can be connected to the first connection portion 21a and the second connection portion 21b. For example, a cross-sectional shape of the through holes 21c, 21d may be an elongated circular shape, a rectangular shape, a triangular shape or the like, and may be a notched shape.

The terminal connection part 22 is a rectangular-shaped flat-plate-like portion which is connected to the electrode terminal of the energy storage device 100 and is parallel to the XY plane. An end portion (an end portion on a minus side in the Y axis direction) of the terminal connection part 22 is connected to the first insert part 23. A portion of the terminal connection part 22 is exposed from the back surface of the lid body 11, and the exposed portion is disposed on an upper surface (a surface on a plus side in the Z axis direction) of the positive electrode terminal 120 of the energy storage device 100 (the positive electrode terminal 120 of the energy storage device 101 in FIG. 3) and is connected to the positive electrode terminal 120.

As shown in FIG. 9, in this embodiment, the positive electrode terminal 120 of the energy storage device 101 includes a terminal position adjusting member 120c for adjusting a connection position with the terminal connection part 22. That is, in the positive electrode terminal 120, the plate-like terminal position adjusting member 120c having a second bolt portion 120d and a second nut portion 120e is fixed by the first bolt portion 120a and a first nut portion 120b for adjusting positions of the bolt portion and the terminal connection part 22. In other words, the positive electrode terminal 120 includes the second bolt portion 120d and the second nut portion 120e in place of the first bolt portion 120a and the first nut portion 120b as members for fixing the positive electrode terminal 120 to the terminal connection part 22.

To be more specific, the terminal connection part 22 is configured such that a through hole 22a is formed in the terminal connection part 22, a peripheral portion of the through hole 22a is exposed to the outside from the lid body 11, and other portions of the through hole 22a are embedded in the lid body 11 by insert molding. Further, the second bolt portion 120d of the positive electrode terminal 120 of the energy storage device 101 is inserted into the through hole 22a, the second nut portion 120e is inserted into the opening portion 11a formed in the lid body 11 above the terminal connection part 22, and the terminal connection part 22 is fastened to the positive electrode terminal 120. That is, the exposed portion of the terminal connection part 22 is disposed on the upper surface (a surface on a plus side in the Z axis direction) of the terminal position adjusting member 120c of the positive electrode terminal 120, and the terminal connection part 22 is connected to the positive electrode terminal 120. Further, the opening portion 11a is sealed by the closing plate 11c. A technique of fastening the terminal connection part 22 and the positive electrode terminal 120 to each other is not limited to fastening using a bolt and a nut.

In this embodiment, the through hole 22a is a through hole having a circular cross-sectional shape. However, a cross-sectional shape of the through 22a may be any shape provided that the terminal connection part 22 can be connected to the positive electrode terminal 120. For example, a cross-sectional shape of the through hole 22a may be an elongated circular shape, a rectangular shape, a triangular shape or the like, and may be a notched shape. The same goes also for shapes of the opening portions 11a and the closing plate 11c. The positive electrode terminal 120 may be configured such that the positive electrode terminal 120 does not include the terminal position adjusting member 120c, and is fixed to the terminal connection part 22 by the first bolt portion 120a and the first nut portion 120b. The through hole 22a corresponds to the above-mentioned through hole 133b.

With such a configuration, the terminal connection part 22 and the positive electrode terminal 120 of the energy storage device 101 can be connected to each other in a state where the terminal connection part 22 and the positive electrode terminal 120 of the energy storage device 101 are brought into face contact with each other. Accordingly, a resistance due to a connection can be suppressed. The terminal connection part 22 and the positive electrode terminal 120 are fastened to each other and hence, the lid body 11 which is integrally formed with the terminal connection part 22 by insert molding and the energy storage device 101 are fastened to each other. The opening portion 11a is sealed by the closing plate 11c and hence, the intrusion of water or the like into the inside of the outer case 10 through the opening portion 11a can be prevented.

The first insert part 23 is a part disposed between the external connection part 21 and the terminal connection part 22, and is formed in the outer case 10 by insert molding. To be more specific, the first insert part 23 is a rectangular-shaped flat-plate-like part which is embedded in the lid body 11 by insert molding and extends parallel to the XZ plane. One end (an end portion on a plus side in the X axis direction) of the first insert part 23 is connected to the first connection portion 21a of the external connection part 21, and the other end (an end portion on a minus side in the Z axis direction) of the first insert part 23 is connected to the terminal connection part 22.

The second insert part 24 is a part which is connected to the external connection part 21 at a position different from the position of the first insert part 23, and is formed in the outer case 10 by insert molding. To be more specific, the second insert part 24 is a rectangular-shaped flat-plate-like part which is embedded in the lid body 11 by insert molding and extends parallel to the XZ plane. An end portion (an end portion on a plus side in the Z axis direction) of the second insert part 24 is connected to the second connection portion 21b of the external connection part 21.

Due to the above-mentioned configuration, the positive electrode external terminal 20 is an integral body formed of the plurality of parts. In this embodiment, the positive electrode external terminal 20 can be formed by bending one plate-like member having conductivity by press working or the like, for example. A member for forming the positive electrode external terminal 20 is not limited to the plate-like member. For example, a solid or hollow rod-like member or the like may be used as the member for forming the positive electrode external terminal 20. However, with the use of the plate-like member, working such as press working of the positive electrode external terminal 20 is facilitated and hence, manufacturing efficiency can be enhanced. Further, with the use of the plate-like member, as described above, the positive electrode external terminal 20 is connected to the positive electrode terminal 120 of the energy storage device 100 in a state where the positive electrode external terminal 20 is brought into face contact with the positive electrode terminal 120 of the energy storage device 100. Accordingly, a resistance due to a connection can be suppressed.

The positive electrode external terminal 20 is formed of a conductive member made of aluminum, for example. However, a material for forming the positive electrode external terminal 20 is not particularly limited. All of the respective parts which constitute the positive electrode external terminal 20 (the external connection part 21, the terminal connection part 22, the first insert part 23, and the second insert part 24) may be made of the same material, or either one of these parts may be made of a material different from a material for forming remaining parts.

On an upper surface portion of the lid body 11, a first upper surface portion 11e having a stepped shape (stepwise shape) is disposed at a position which opposedly faces the first connection portion 21a of the positive electrode external terminal 20. To be more specific, the first upper surface portion 11e is disposed below the through hole 21c of the first connection portion 21a away from the first connection portion 21a. With such a configuration, a gap is formed between an outer surface (first upper surface portion 11e) of the outer case 10 and a portion (first connection portion 21a) of the positive electrode external terminal 20 which extends along the outer surface.

Figure 11:
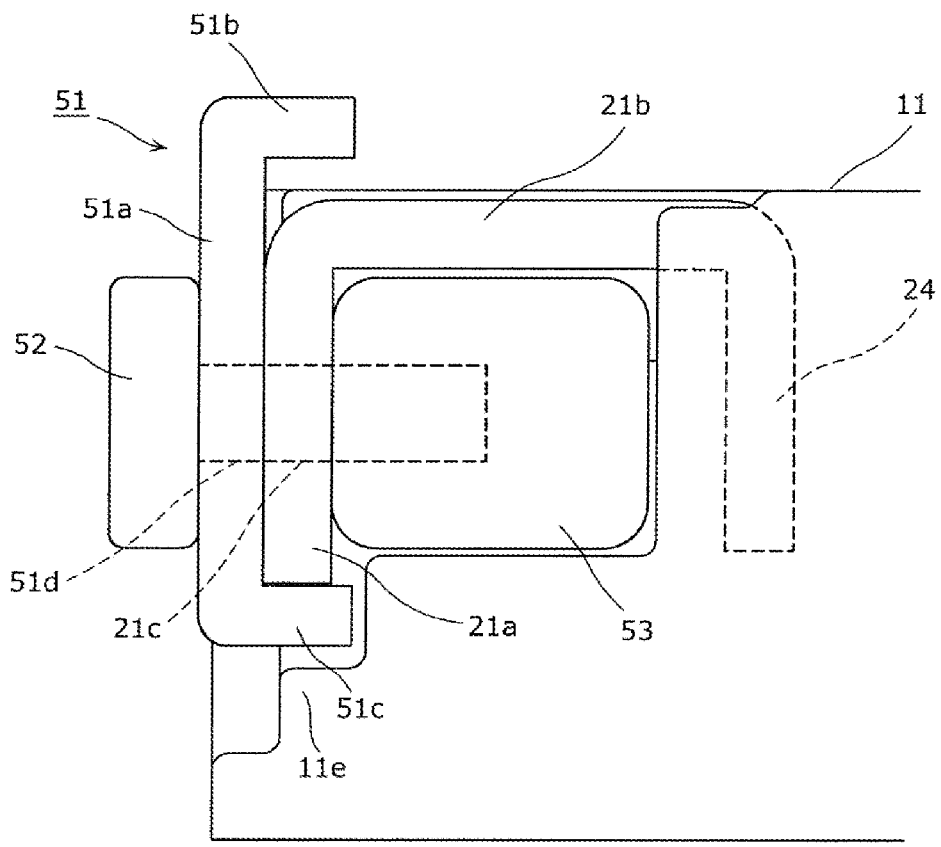
FIG. 11 is a plan view showing the configuration when a terminal with a rotation stopper is connected to a first connection portion of the positive electrode external terminal according to the embodiment.

With such a configuration, as shown in FIG. 11, a rotation stopping terminal 51 which is an external conductive member can be connected to the first connection portion 21a of the positive electrode external terminal 20. FIG. 11 is a plan view showing the configuration where the rotation stopping terminal 51 is connected to the first connection portion 21a of the positive electrode external terminal 20 according to the embodiment of the present invention. FIG. 11 is a view corresponding to FIG. 10(b).

The rotation stopping terminal 51 has: a terminal body portion 51a; a projecting portion 51b which projects from an upper end portion of the terminal body portion 51a toward a plus side in the Y axis direction; and a projecting portion 51c which projects from a lower end portion of the terminal body portion 51a toward a plus side in the Y axis direction. A through hole 51d is formed in the terminal body portion 51a.

The rotation stopping terminal 51 is disposed such that the projecting portion 51c is inserted into the gap formed between the first connection portion 21a and the first upper surface portion 11e of the lid body 11, and the terminal body portion 51a is brought into contact with a side surface of the first connection portion 21a on a minus side in the Y axis direction. A square nut 53 is disposed on a plus side in the Y axis direction of the first connection portion 21a, and a bolt 52 is inserted in the through holes 51d, 21c from a minus side in the Y axis direction of the terminal body portion 51a, and the bolt 52 and the nut 53 are fastened to each other. Shapes of the bolt 52 and the nut 53 are not limited to the shapes shown in the drawing.

In the same manner as the first connection portion 21a, also with respect to the second connection portion 21b, a gap is formed between the second connection portion 21b and the outer surface of the lid body 11 (a surface parallel to the YZ plane) on a side of the second connection portion 21b (a minus side in the X axis direction) and hence, a rotation stopping terminal described above can be connected also to the second connection portion 21b.

Next, the configuration of the negative electrode external terminal 30 is described mainly with respect to points which make the negative electrode external terminal 30 different from the positive electrode external terminal 20.

Returning to FIG. 8, the negative electrode external terminal 30 has: the external connection part 31; the first insert part 33; the second insert part 34; and the terminal connection part 32. The negative electrode external terminal 30 further has the fuse 40 which is detachably connected between the terminal connection part 32 and the first insert part 33. In this embodiment, the external connection part 31, the first insert part 33, and the second insert part 34 are integrally formed with each other. That is, the external connection part 31, the first insert part 33 and the second insert part 34 are formed using one plate-like member. Here, the configuration "formed using one plate-like member" also includes a configuration where a plurality of plate-like members are contiguously connected to each other by welding or the like.

The external connection part 31 is a body portion of the negative electrode external terminal 30 which is connected to an external conductive member, and is disposed in an exposed manner to the outside from the lid body 11. The external connection part 31 has, in the same manner as the external connection part 21 of the positive electrode external terminal 20, a first connection portion extending from the first insert part 33, and a second connection portion extending from the second insert part 34. However, these first and second connection portions have the same configuration as the external connection part 21 and hence, the detailed description of the first and second connection portions is omitted. Also the external connection part 31 is configured such that, when an extending direction of the first connection portion is assumed as a first direction, and an extending direction of the second connection portion is assumed as a second direction, a third direction which is orthogonal to the first direction in the first connection portion and a fourth direction which is orthogonal to the second direction in the second connection portion differ from each other (to be more specific, are orthogonal to each other).

The terminal connection part 32 is a plate-like part which is connected to the electrode terminal of the energy storage device 100 and extends in the X axis direction. To be more specific, the terminal connection part 32 is configured such that a portion of the terminal connection part 32 around a through hole 32a formed on an end portion of the terminal connection part 32 on a plus side in the X axis direction and an end portion 32b of the terminal connection part 32 on a minus side in the X axis direction to which the fuse 40 is connected are exposed to the outside from the lid body 11, and other portions of the terminal connection part 32 are embedded in the lid body 11 by insert molding. The end portion 32b of the terminal connection part 32 is detachably connected (fastened) to one of fuse connection portions 122 of the fuse 40. The through hole 32a corresponds to the above-mentioned through hole 131b, and the end portion 32b corresponds to the above-mentioned exposed portion 131A.

A bolt portion of the negative electrode terminal 130 of the energy storage device 104 is inserted into the through hole 32a, and a nut is inserted into the opening portion 11b formed above the terminal connection part 32 so that the terminal connection part 32 is fastened to the negative electrode terminal 130. In this embodiment, in the connection between the negative-electrode-side terminal connection part 32 and the negative electrode terminal 130, unlike the positive electrode side, a terminal position adjusting member is not disposed. However, a terminal position adjusting member may be provided also on the negative electrode side. The opening portion 11b is sealed by the closing plate 11d. A technique of fastening the terminal connection part 32 and the negative electrode terminal 130 is not limited to fastening using a bolt and a nut.

In this embodiment, the through hole 32a is a through hole having a circular cross-sectional shape. However, a cross-sectional shape of the through hole 32a may be any shape provided that the terminal connection part 32 can be connected to the negative electrode terminal 130. For example, a cross-sectional shape of the through hole 32a may be an elongated circular shape, a rectangular shape, a triangular shape or the like, and may be a notched shape. The same goes also for cross-sectional shapes of the opening portion 11b and the closing plate 11d.

The first insert part 33 is a plate-like part which is disposed between the external connection part 31 and the terminal connection part 32, is formed in the outer case 10 by insert molding, and is disposed in an extending manner in the Y axis direction. To be more specific, the first insert part 33 is configured such that an end portion 33a of the first insert part 33 to which the fuse 40 is connected is exposed to the outside from the lid body 11, and other portions of the first insert part 33 is embedded in the lid body 11 by insert molding. The end portion 33a of the first insert part 33 is detachably connected (fastened) to the other fuse connection portion 122 of the fuse 40. The end portion 33a corresponds to the above-mentioned exposed portion 132A.

In this manner, the fuse 40 is detachably connected to the end portion 32b of the terminal connection part 32 and the end portion 33a of the first insert part 33. Accordingly, when it is necessary to exchange the fuse 40 due to external short-circuiting of the energy storage apparatus 1, the fuse 40 can be easily exchanged.

In this embodiment, the fuse 40, the end portion 32b of the terminal connection part 32, the end portion 33a of the first insert part 33 are fastened to each other using bolts and nuts. However, a technique of fastening these parts to each other is not limited to such a configuration. For example, the fuse 40 and the end portion 32b and the end portion 33a may be detachably connected to each other by swaging, engaging or fitting. Alternatively, the fuse 40, the end portion 32b, and the end portion 33a may be fixed to each other by a member which is provided as a part separate from the fuse 40, the end portion 32b and the end portion 33a.

The fuse 40, the end portion 32b, the end portion 33a are also not limited to the configuration where the fuse 40, the end portion 32b, the end portion 33a are detachably connected to each other. For example, the negative electrode external terminal 30 may be configured such that the fuse 40 is fixed to the end portion 32b and the end portion 33a by welding or the like so that all of the external connection part 31 the terminal connection part 32, the first insert part 33, the second insert part 34, and the fuse 40 are integrally formed with each other.

The second insert part 34 is a rectangular-shaped flat-plate-like part which is connected to the external connection part 31 at a position different from a position of the first insert part 33, is formed in the outer case 10 by insert molding, and is parallel to the XZ plane.

In the above-mentioned configuration, in the same manner as the positive electrode external terminal 20, the negative electrode external terminal 30 can be formed by bending a plate-like member having conductivity by press working or the like, for example. Also the negative electrode external terminal 30 is formed of a conductive member made of aluminum, for example. All of the respective parts which constitute the negative electrode external terminal 30 (the external connection part 31, the terminal connection part 32, the first insert part 33, and the second insert part 34) may be made of the same material, or either one of these parts may be made of a material different from a material for forming remaining parts.

In the same manner as the positive electrode external terminal 20, a gap is formed also between the lid body 11 and the external connection part 31 of the negative electrode external terminal 30 and hence, in the same manner as the external connection part 21 of the positive electrode external terminal 20, a rotation stopping terminal can be connected to the external connection part 31.

As described above, according to the energy storage apparatus 1 of the embodiment of the present invention, the following advantageous effects can be acquired. Hereinafter, advantageous effects of the positive electrode external terminal 20 are described. With respect to the negative electrode external terminal 30, the description of advantageous effects substantially equal to the advantageous effects of the positive electrode external terminal 20 is omitted.

The positive electrode external terminal 20 includes: the external connection part 21 connected to the external conductive member; the terminal connection part 22 connected to the positive electrode terminal 120 of the energy storage device 100; and the first insert part 23 formed in the outer case 10 by insert molding between the external connection part 21 and the terminal connection part 22. That is, the positive electrode external terminal 20 is directly connected to the positive electrode terminal 120 of the energy storage device 100, and portions of the positive electrode external terminal 20 other than the portions which are connected to the positive electrode terminal 120 of the energy storage device 100 and the external conductive member are formed in the outer case 10 by insert molding. With such a configuration, it is unnecessary to dispose an additional conductive member between the positive electrode external terminal 20 and the positive electrode terminal 120 of the energy storage device 100. Further, insulation property can be ensured with the simple configuration referred to as insert molding. According to the energy storage apparatus 1, the positive electrode external terminal 20 can be disposed with the simple configuration.

Further, the positive electrode external terminal 20 and the like are formed in the outer case 10 by insert molding and hence, a space in which the energy storage device 100 is disposed can be sealed by a gastight structure. Accordingly, the energy storage device 100 is applicable to an energy storage apparatus which is mounted on a miniaturized prime-mover-equipped device such as a battery for starting an engine of a motorcycle and is placed in an environment where there is a possibility that rain water falls on the energy storage apparatus during a usual use.

Further, the positive electrode external terminal 20 is formed in the outer case 10 by insert molding and hence, rigidity of the outer case 10 can be enhanced.

The positive electrode external terminal 20 further has the second insert part 24, and insert molding of the positive electrode external terminal 20 in the outer case 10 is performed at two places of the first insert part 23 and the second insert part 24. Accordingly, the positive electrode external terminal 20 can be firmly fixed to the outer case 10.

In the external connection part 21, the direction (third direction) which is orthogonal to the extending direction (first direction) from the first insert part 23 of the first connection portion 21a and the direction (fourth direction) which is orthogonal to the extending direction (second direction) from the second insert part 24 of the second connection portion 21b differ from each other. That is, for example, the first connection portion 21a is formed in the outer case 10 by insert molding in the vertical direction, while the second connection portion 21b is formed in the outer case 10 by insert molding in the horizontal direction. In this manner, the direction that the first connection portion 21a is formed in the outer case 10 by insert molding and the direction that the second connection portion 21b is formed in the outer case 10 by insert molding differ from each other. Accordingly, for example, even when a torque is applied to the positive electrode external terminal 20 when the external conductive member is connected to the positive electrode external terminal 20, the positive electrode external terminal 20 can be firmly fixed to the outer case 10.

Further, a gap is formed between the outer surface of the outer case 10 and the external connection part 21. Accordingly, in connecting the external conductive member to the positive electrode external terminal 20, it is possible to prevent the rotation of the conductive member by inserting a portion of the conductive member in the gap. That is, it is possible to adopt the terminal having a rotation stopping terminal 51 as the external conductive member connected to the positive electrode external terminal 20.

Further, the external connection part 21, the terminal connection part 22 and the first insert part 23 and the second insert part 24 are integrally formed into an integral body and hence, the positive electrode external terminal 20 can be disposed with the simple configuration.

Further, the negative electrode external terminal 30 has the fuse 40 between the external connection part 31 and the terminal connection part 32. Accordingly, the negative electrode external terminal 30 can also have a fuse function.

(Modification 1)

Figure 12:
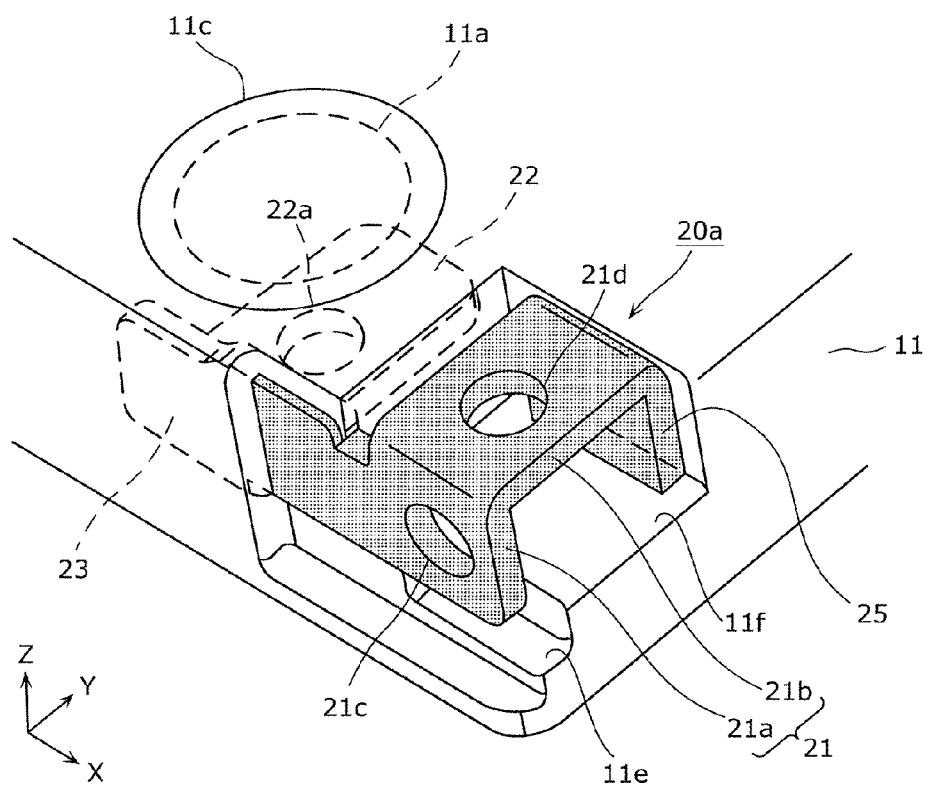
FIG. 12 is a perspective view showing the configuration of a positive electrode external terminal according to a modification 1 of the embodiment and the configuration around the positive electrode external terminal according to the modification 1 in detail.

Next, a modification 1 of the above-mentioned embodiment is described. FIG. 12 is a perspective view showing the configuration of a positive electrode external terminal 20a and the configuration around the positive electrode external terminal 20a according to the modification 1 of the embodiment of the present invention in detail. To be more specific, FIG. 12 is a drawing corresponding to FIG. 9.

As shown in FIG. 12, the positive electrode external terminal 20a differs from the positive electrode external terminal 20 of the above-mentioned embodiment with respect to a point that the positive electrode external terminal 20a includes an engaging portion 25 in place of the second insert part 24 of the positive electrode external terminal 20 of the above-mentioned embodiment. The modification 1 is substantially equal to the above-mentioned embodiment with respect to other configurations and hence, their detailed explanation is omitted.

The engaging portion 25 is a portion to be engaged with an outer case 10 and is connected to an external connection part 21 at a position different from a first insert part 23 and is arranged in an exposed manner from a lid body 11. To be more specific, the engaging portion 25 is a rectangular-shaped flat-plate-like portion parallel to an XZ plane and is arranged in such a manner where an upper end portion (end portion on a plus side in a Z axis direction) of the engaging portion 25 is connected to a second connection portion 21b of the external connection part 21 and a lower end portion (end portion on a minus side in the Z axis direction) of the engaging portion 25 is brought into contact (grounded) with a second upper surface portion 11f of the lid body 11. A side surface of the engaging portion 25 on a plus side in a Y axis direction may be brought into contact with a side surface of the lid body 11 or there may be a gap between the side surface of the engaging portion 25 and the side surface of the lid body 11.

As has been described above, according to the energy storage apparatus of the modification 1, the positive electrode external terminal 20a is engaged with the outer case 10 by way of the engaging portion 25. Accordingly, even when a torque is applied to the positive electrode external terminal 20a when an external conductive member is connected to the first connection portion 21a of the positive electrode external terminal 20a, the positive electrode external terminal 20a can be firmly fixed to the outer case 10. Further, substantially the same configuration can be applied to the negative electrode side.

(Modification 2)

Figure 13:
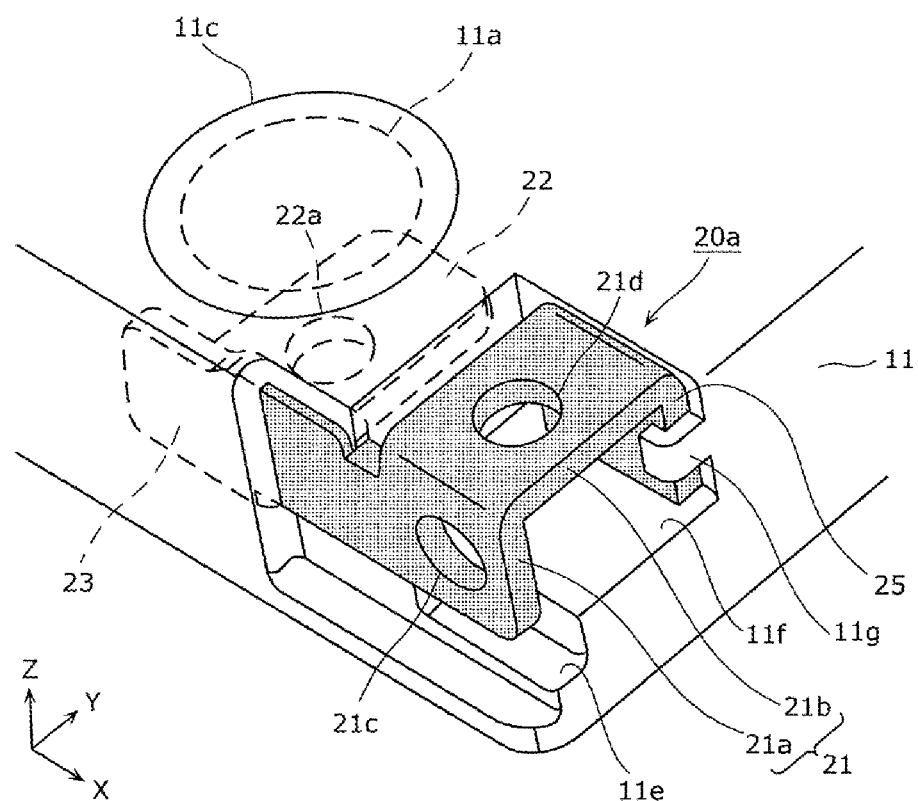
FIG. 13 is a perspective view showing the configuration of a positive electrode external terminal according to a modification 2 of the embodiment and the configuration around the positive electrode external terminal according to the modification 2 in detail.

Next, a modification 2 of the above-mentioned embodiment is described. FIG. 13 is a perspective view showing a configuration of a positive electrode external terminal 20a and a configuration around the positive electrode external terminal 20a according to the modification 2 of the embodiment of the present invention in detail. To be more specific, FIG. 13 is a drawing corresponding to FIG. 9.

As shown in FIG. 13, the modification 2 differs from the above-mentioned modification 1 with respect to a point that a pawl portion 11g is mounted on the lid body 11 of the above-mentioned modification 1. The modification 2 is substantially equal to the above-mentioned modification 1 with respect to other configurations and hence, their detailed description is omitted.

The pawl portion 11g is a projected portion arranged such that the pawl portion 11g sandwiches a side end portion (an end portion on a plus side in an X axis direction) of the engaging portion 25 from both sides in a thickness direction (Y axis direction). Thus, a lower end portion of the engaging portion 25 is engaged with a second upper surface portion 11f of the lid body 11 and a side end portion of the engaging portion 25 is engaged with the pawl portion 11g. The pawl portion 11g may have any shape provided that the pawl portion 11g is engaged (brought into contact) with the side end portion of the engaging portion 25. Further, the engaging portion 25 may not be engaged (brought into contact) with the second upper surface portion 11f of the lid body 11.

As has been described above, according to the energy storage apparatus of the modification 2, in the positive electrode external terminal 20a, the engaging portion 25 is engaged with the pawl portion 11g of the outer case 10. Accordingly, even when a torque is applied to the positive electrode external terminal 20a when an external conductive member is connected to a first connection portion 21a of the positive electrode external terminal 20a, the positive electrode external terminal 20a can be firmly fixed to the outer case 10. Further, substantially the same configuration can be applied to the negative electrode side.

(Modification 3)

Figure 14:
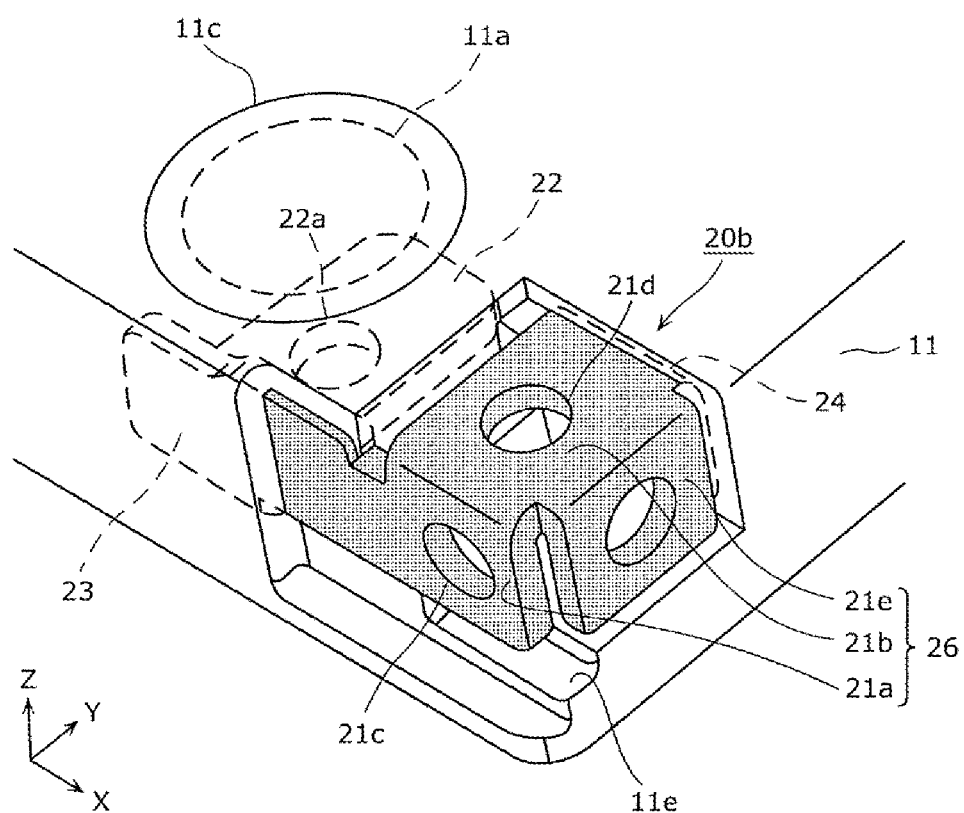
FIG. 14 is a perspective view showing the configuration of a positive electrode external terminal according to a modification 3 of the embodiment and the configuration around the positive electrode external terminal according to the modification 3 in detail.
Figure 15:
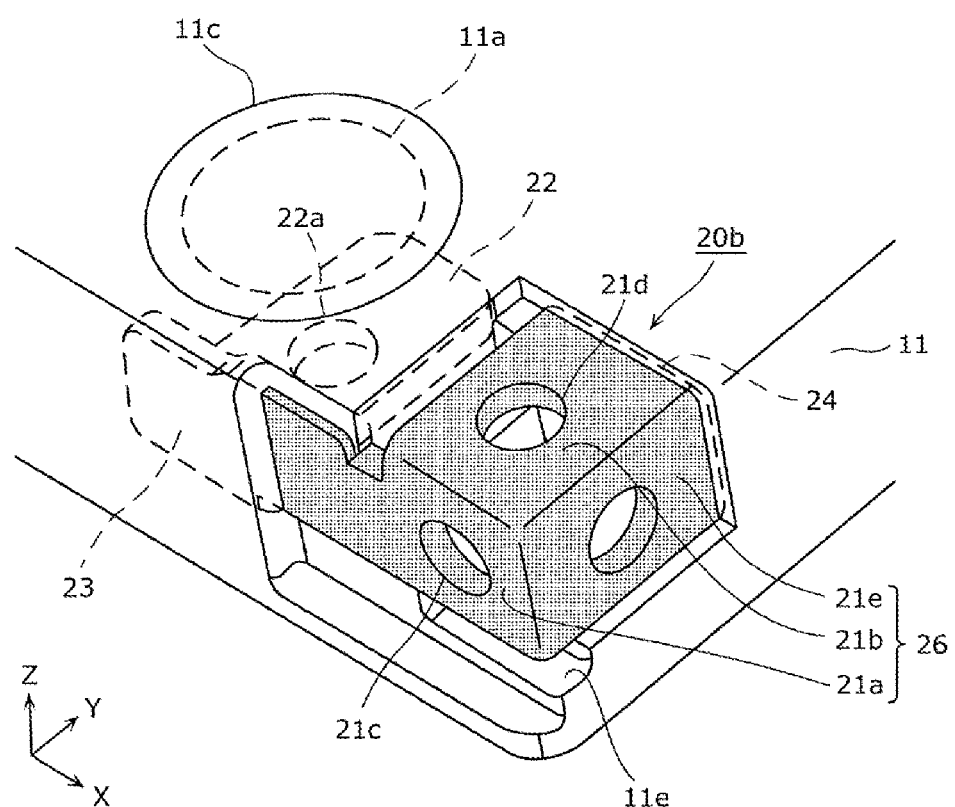
FIG. 15 is a perspective view showing the configuration of the positive electrode external terminal according to the modification 3 of the embodiment and another configuration around the positive electrode external terminal according to the modification 3 in detail.

Next, a modification 3 of the above-mentioned embodiment is described. FIG. 14 is a perspective view showing a configuration of a positive electrode external terminal 20b and a configuration around the positive electrode external terminal 20b according to the modification 3 of the embodiment of the present invention in detail. FIG. 15 is a perspective view showing another configuration of the positive electrode external terminal 20b and another configuration around the positive electrode external terminal 20b according to the modification 3 of the embodiment of the present invention in detail. To be more specific, FIG. 14 and FIG. 15 are drawings corresponding to FIG. 9.

As shown in FIG. 14, the positive electrode external terminal 20b differs from the positive electrode external terminal 20 of the above-mentioned embodiment with respect to a point that the positive electrode external terminal 20b includes a third connection portion 21e in addition to the configuration of the positive electrode external terminal 20 of the above-mentioned embodiment. That is, an external connection part 26 of the modification 3 includes the third connection portion 21e in addition to a first connection portion 21a and a second connection portion 21b which are provided to the external connection part 21. The modification 3 is substantially equal to the above-mentioned embodiment with respect to other configurations and hence, detailed description is omitted.

The third connection portion 21e is a rectangular-shaped flat-plate-like portion parallel to a YZ plane, is connected to the second connection portion 21b and is disposed to be exposed from a lid body 11. To be more specific, an upper end portion (end portion on a plus side in a Z axis direction) of the third connection portion 21e is connected to the second connection portion 21b and the third connection portion 21e is bent to extend downward (toward a minus side in the Z axis direction) from the second connection portion 21*b*. That is, the third connection portion 21*e* is a connection portion which is arranged toward a direction different from the first connection portion 21*a* and the second connection portion 21*b*.

Further, a through hole is formed in the third connection portion 21*e* in substantially the same manner as the first connection portion 21*a* and the second connection portion 21*b*. Accordingly, the positive electrode external terminal 20*b* can be connected to an external conductive member through the through hole. That is, the positive electrode external terminal 20*b* can be connected to an external conductive member by inserting a bolt into the through hole of the third connection portion 21*e*, the through hole 21*c* of the first connection portion 21*a* or the through hole 21*d* of the second connection portion 21*b* and by fastening a nut to the bolt. In the configuration of the modification 3, it is difficult to dispose a nut in the same manner as the above-mentioned embodiment. Accordingly, these through holes may be formed into threaded holes so that bolts can be connected.

Thus, the positive electrode external terminal 20*b* is connectable with the external conductive member at three connection portions consisting of the first connection portion 21*a*, the second connection portion 21*b* and the third connection portion 21*e* of the external connection part 26 which are arranged to face toward three different directions. Respective members of the positive electrode external terminal 20*b* are formed into an integral body. That is, the positive electrode external terminal 20*b* is formed by bending one plate-like member or the like.

The third connection portion 21*e* may be connected to at least one of the first connection portion 21*a* and the second insert part 24 as well as the second connection portion 21*b*. That is, as shown in FIG. 15, for example, the third connection portion 21*e* may be configured such that an upper end portion (end portion on a plus side in a Z axis direction) thereof is connected to the second connection portion 21*b*, one side end portion (end portion on a minus side in a Y axis direction) thereof is connected to the first connection portion 21*a*, and the other side end portion (end portion on a plus side in the Y axis direction) thereof is connected to the second insert part 24. This configuration can be realized by connecting the second connection portion 21*b* with the first connection portion 21*a* and with the second insert part 24 in the configuration shown in FIG. 14 by welding or by casting or the like. In the configuration shown in FIG. 15 also, through holes formed in the first connection portion 21*a*, the second connection portion 21*b* and the third connection portion 21*e* may be formed into threaded holes.

As has been described above, according to the energy storage apparatus of the modification 3, the positive electrode external terminal 20*b* further includes the third connection portion 21*e*. Accordingly, freedom in connection with the external conductive member can be enhanced. Further, as shown in FIG. 15, by connecting the third connection portion 21*e*, strength of the positive electrode external terminal 20*b* can be also enhanced. Further, substantially the same configuration can be applied to the negative electrode side.

(Other Modifications and the Like)

Although the energy storage apparatus 1 according to the embodiment of the present invention and the modifications of the embodiment have been described heretofore, the present invention is not limited to the above-mentioned embodiment and the modifications of the embodiment. That is, it should be construed that the embodiment and the modifications of the embodiment disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

For example, according to the above-mentioned embodiment and the modifications of the embodiment, the energy storage apparatus 1 includes the outer case 10 which accommodates one or more energy storage device 100. However, it is sufficient that the outer case 10 be disposed outside the energy storage device 100. The outer case 10 may not accommodate the energy storage device 100. For example, the outer case 10 may be arranged such that the outer case 10 sandwiches the energy storage device 100 from both sides of the energy storage device 100.

Further, according to the above-mentioned embodiment and the modifications of the embodiment, the fuse 40 is accommodated in the recessed portion 10A. However, the fuse 40 may not be accommodated in the recessed portion 10A. That is, the energy storage apparatus may be configured such that the outer case 10 has no recessed portion 10A and the exposed portion 131A of the bus bar 131 and the exposed portion 132A of the bus bar 132 may be exposed from an outer peripheral surface of the outer case 10.

Further, according to the above-mentioned embodiment and the modifications of the embodiment, the outer case 10 includes the lid portion 13. However, the outer case 10 may not include the lid portion 13. That is, an inner surface of the recessed portion 10A may be exposed to the outside of the energy storage apparatus 1.

Further, according to the above-mentioned embodiment of the present invention and the modifications of the embodiment, the bus bar 132 is integrally formed with the external connection part 31 and the bus bar 133 is integrally formed with the external connection part 21. However, these members may be formed separately. Further, according to the above-mentioned embodiment, the negative electrode external terminal 30 and the positive electrode external terminal 20 (bus bar 131 to 133) are formed on the lid body 11. However, at least one of the negative electrode external terminal 30 and the positive electrode external terminal 20 may be formed on the outer case body 12.

Further, in the above-mentioned description, the fuse 40 is arranged between two bus bars 131 and 132 which are formed in the outer case 10 by insert molding. However, the present invention is not limited to such a configuration. For example, the fuse 40 may be configured such that one end of the fuse 40 is connected to the bus bar formed in the outer case 10 by insert molding and the other end of the fuse 40 is connected to the external connection part 31, 21 or the like directly without interposing the bus bar.

Further, according to the above-mentioned embodiment and the modifications of the embodiment, the fuse 40 is disposed between the bus bar 131 and the bus bar 132 on the negative electrode side (between the terminal connection part 32 of the negative electrode external terminal 30 and the first insert part 33). However, the fuse 40 may be mounted on the bus bar 133 on the positive electrode side (positive electrode external terminal 20). That is, the fuse 40 may be disposed between the electrode terminal of the energy storage device 100 and the external connection part 21 such as in a case where, for example, the fuse 40 is disposed on the first insert part 23. In this case, it is preferable that, on the positive electrode side also, in the same manner as the negative electrode side, the terminal connection part 22 be an inner exposed portion, and the first insert part 23 include an outer exposed portion to which the fuse 40 is detachably mounted and a connection plate portion which connects the outer exposed portion and the inner exposed portion to each other.

Further, according to the above-mentioned embodiment and the modifications of the embodiment, both of the positive electrode external terminal 20 and the negative electrode external terminal 30 are formed in the outer case 10 by insert molding. However, either one of the positive electrode external terminal 20 and the negative electrode external terminal 30 may not be formed in the outer case 10 by insert molding.

Further, according to the above-mentioned embodiment and the modifications of the embodiment, the positive electrode external terminal 20 and the negative electrode external terminal 30 are formed in the lid body 11 by insert molding. However, at least one of the positive electrode external terminal 20 and the negative electrode external terminal 30 may be formed in the outer case body 12 by insert molding.

Further, according to the above-mentioned embodiment and the modifications of the embodiment, the positive electrode external terminal 20 includes the second insert part 24 and the negative electrode external terminal 30 includes the second insert part 34. However, at least one of the positive electrode external terminal 20 and the negative electrode external terminal 30 may not include the second insert part.

Further, according to the above-mentioned embodiment and the modifications of the embodiment, the fuse 40 is mounted on the negative electrode external terminal 30. However, the fuse 40 may not be mounted on neither of the positive electrode external terminal 20 nor the negative electrode external terminal 30. In this case, it is preferable that both of the positive electrode external terminal 20 and the negative electrode external terminal 30 be formed into an integral body.

Further, according to the above-mentioned embodiment and the modifications of the embodiment, the terminal connection part 22 of the positive electrode external terminal 20 is directly connected to the positive electrode terminal 120 of the energy storage device 101. However, the terminal connection part 22 and the positive electrode terminal 120 may be connected to each other via a leading wire, a wiring wire or the like. That is, it is sufficient that the terminal connection part 22 be exposed from an inner front surface of the lid body 11. Thus, when the terminal connection part 22 and the positive electrode terminal 120 are connected with each other via a leading wire or the like, it is unnecessary to provide the opening portion 11a and the closing plate 11c. That is, it is sufficient that the leading wire or the like be connected (fixed) to the positive electrode terminal 120 by soldering or the like in advance, and the lid body 11 covers and is welded to the outer case body 12 by thermal welding. With respect to the negative electrode side also, in substantially the same manner, the terminal connection part 32 and the negative electrode terminal 130 may be connected to each other via a leading wire, a wiring wire or the like. In this case, it is unnecessary to provide the opening portion 11b and the closing plate 11d.

Modes which are formed by combining the above-mentioned embodiment and the modifications of the embodiment as desired also fall within the scope of the present invention. The partial configurations of the above-mentioned embodiment and the modifications of the embodiment may be also combined as desired.

INDUSTRIAL APPLICABILITY

The present invention is applicable to an energy storage apparatus and the like which is mounted on a miniaturized prime mover equipped device such as a battery for starting an engine of a motorcycle.

DESCRIPTION OF REFERENCE SIGNS

1: energy storage apparatus
10: outer case
10A: recessed portion
11: lid body
11a, 11b: opening portion
11c, 11d: closing plate
11e: first upper surface portion
11f second upper surface portion
11g: pawl portion
12: outer case body
13: lid portion
13a: screw
20, 20a, 20b: positive electrode external terminal
21, 26, 31: external connection part
21a: first connection portion
21b: second connection portion
21c, 21d, 22a, 32a, 51d, 122a, 131b, 133b: through hole
21e: third connection portion
22, 32: terminal connection part
23, 33: first insert part
24, 34: second insert part
25: engaging portion
30: negative electrode external terminal
32b, 33a: end portion
40: fuse (circuit breaking part)
50, 131 to 134: bus bar
51: rotation stopping terminal
51a: terminal body portion
51b, 51c: projecting portion
52: bolt
53: nut
60: fastening portion
100, 101 to 104: energy storage device
110: container
110a: deep bottom recessed portion
110b, 110c: shallow bottom recessed portion
120: positive electrode terminal
120a: first bolt portion
120b: first nut portion
120c: terminal position adjusting member
120d: second bolt portion
120e: second nut portion
121: fuse body portion
122: fuse connection portion
130: negative electrode terminal
131A, 131B, 132A, 133B: exposure part
131C: connection plate portion

The invention claimed is:
1. An energy storage apparatus, comprising:
an energy storage device which includes an electrode terminal;
an outer case; and
an external connection terminal, wherein the external connection terminal includes:
  an external connection part to be connected to an external conductive member;
  a circuit breaking part; and
  a bus bar which connects the electrode terminal or the external connection part with the circuit breaking part, and which is formed inside the outer case and has an insert-molded structure such that the bus bar is integrally formed with the outer case,
wherein the bus bar includes an outer exposed portion on which the circuit breaking part is detachably mounted from an outside of the outer case,
wherein the outer case includes:
  a body which accommodates the energy storage device; and
  a lid body which covers an opening of the body and inside which the bus bar is formed by insert molding,
wherein the outer exposed portion is exposed from the lid body, and
wherein the bus bar is disposed inside the lid body.

2. The energy storage apparatus according to claim 1, wherein the outer case includes a recessed portion which opens toward the outside of the outer case and accommodates the circuit breaking part, and
  wherein the outer exposed portion is exposed from an inner surface of the recessed portion.

3. The energy storage apparatus according to claim 2, wherein the outer case includes a lid portion which openably closes an opening of the recessed portion, and the lid portion is configured to cover the outer exposed portion in a state where the lid portion closes the opening.

4. The energy storage apparatus according to claim 2, wherein the bus bar is bent following a recess in the recessed portion.

5. The energy storage apparatus according to claim 1, further comprising a fastening portion configured to detachably fasten the circuit breaking part to the outer exposed portion,
  wherein a portion of the fastening portion is formed in the outer case by insert molding.

6. The energy storage apparatus according to claim 1, wherein the bus bar connects the external connection part and the circuit breaking part to each other, and is integrally formed with the external connection part.

7. The energy storage apparatus according to claim 1, wherein the bus bar includes a first bus bar which connects the external connection part and the circuit breaking part to each other, and a second bus bar which connects the electrode terminal and the circuit breaking part to each other, and
  wherein the circuit breaking part is disposed between the first bus bar and the second bus bar.

8. The energy storage apparatus according to claim 1, wherein
  an upper surface of the bus bar is located below an upper surface of the lid body.

9. The energy storage apparatus according to claim 8, wherein the bus bar includes:
  an inner exposed portion exposed to the inside of the outer case at a position shifted from the outer exposed portion as viewed in a top plan view of the lid body; and
  a connection plate portion which is formed in the outer case by insert molding and connects the outer exposed portion and the inner exposed portion to each other.

10. The energy storage apparatus according to claim 1, wherein the bus bar is formed in the outer case by insert molding at a position which oppositely faces the electrode terminal.

11. The energy storage apparatus according to claim 1, wherein the outer exposed portion is positioned on a surface of the outer case on a side opposite to a position where the external connection part is disposed.

12. The energy storage apparatus according to claim 1, wherein a cross-sectional area of the bus bar is set equal to or larger than a cross-sectional area of the external connection part.

13. The energy storage apparatus according to claim 1, wherein the bus bar includes:
  a terminal connection part connected to an electrode terminal of the energy storage device; and
  a first insert part disposed between the external connection part and the terminal connection part, and formed in the outer case by insert molding.

14. The energy storage apparatus according to claim 13, wherein the external connection terminal further includes an engaging portion which is connected to the external connection part at a position different from the first insert part, and is engaged with the outer case.

15. The energy storage apparatus according to claim 13, wherein the external. connection terminal further includes a second insert part which is connected to the external connection part at a position different from the first insert part, and is formed in the outer case by insert molding.

16. The energy storage apparatus according to claim 15, wherein the external connection part includes:
  a first connection portion extending in a first direction from the first insert part; and
  a second connection portion. extending in a second direction from the second insert part, and
  a third direction which is orthogonal to the first direction in the first connection portion in a direction which differs from a fourth direction orthogonal to the second direction in the second connection portion.

17. The energy storage apparatus according to claim 13, wherein a gap is formed between an outer surface of the outer case and a portion extending along the outer surface of the external connection part.

18. The energy storage apparatus according to claim 13, wherein the external connection part, the terminal connection part, and the first insert part are formed into an integral body.

19. The energy storage apparatus according to claim 1,
  wherein the bus bar is disposed above a bottom surface of the lid body, an upper surface of the bus bar being located below an upper surface of the lid body, and
  wherein an end portion of bus bar is connected to the electrode terminal and an other end portion of bus bar is connected to the external connection part, the outer exposed portion of the bus bar being located between the end portion of bus bar and the other end portion of bus bar.

20. An energy storage apparatus, comprising:
  an energy storage device which includes an electrode terminal;
  an outer case that includes an outer case body which accommodates the energy storage device, and a lid body which closes an opening of the outer case body;
  an external connection part to be connected to an external conductive member;
  a circuit breaking part; and
  a bus bar which connects the electrode terminal at a first area of the bus bar or connects the external connection part with the circuit breaking part at a second area of the bus bar, wherein the bus bar is disposed between opposing surfaces of the lid body such that an upper surface of the bus bar is located below an upper surface of the lid body, wherein the circuit breaking part is detachably mounted from an outside of the outer case to a third area of the bus bar located between the first area of the bus bar and the second area of the bus bar, wherein the bus bar is formed inside the lid body by insert molding, wherein the bus bar includes an outer exposed portion that is exposed from the lid body, and wherein the bus bar is disposed inside the lid body.

\* \* \* \* \*